United States Patent
Lam et al.

(10) Patent No.: US 11,924,351 B1
(45) Date of Patent: Mar. 5, 2024

(54) OPTIMIZING DATA TRANSACTIONS AND VERIFICATION ON A BLOCKCHAIN NETWORK

(71) Applicant: Hong Kong Applied Science and Technology Research Institute Company Limited, Hong Kong (HK)

(72) Inventors: Tak Wing Lam, Hong Kong (HK); Tak Fuk Wong, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 18/107,638

(22) Filed: Feb. 9, 2023

(51) Int. Cl.
  *H04L 9/32*  (2006.01)
  *H04L 9/00*  (2022.01)
  *H04L 9/08*  (2006.01)

(52) U.S. Cl.
  CPC .......... *H04L 9/3236* (2013.01); *H04L 9/0872* (2013.01); *H04L 9/50* (2022.05)

(58) Field of Classification Search
  CPC ........ H04L 9/3236; H04L 9/0872; H04L 9/50
  See application file for complete search history.

(56) References Cited

U.S. PATENT DOCUMENTS

| | | | |
|---|---|---|---|
| 10,754,961 B2 | 8/2020 | Hsiao et al. | |
| 11,082,203 B2 | 8/2021 | Hari et al. | |
| 11,418,342 B2 | 8/2022 | Lam et al. | |
| 2017/0148016 A1* | 5/2017 | Davis | H04L 9/3239 |
| 2017/0364552 A1* | 12/2017 | Pattanaik | G06F 16/2365 |
| 2017/0366516 A1* | 12/2017 | Pattanaik | H04L 9/3236 |
| 2018/0025166 A1* | 1/2018 | Daniel | G06F 9/5011 |
| | | | 713/189 |
| 2019/0007437 A1* | 1/2019 | Smelker | H04L 63/1408 |

(Continued)

FOREIGN PATENT DOCUMENTS

| | | |
|---|---|---|
| CN | 109408521 A | 3/2019 |
| CN | 110598448 A | 12/2019 |

(Continued)

OTHER PUBLICATIONS

ISR and Written Opinion, PCT/CN2023/076333, dated Oct. 26, 2023.

*Primary Examiner* — Matthew Smithers
(74) *Attorney, Agent, or Firm* — Stuart T. Auvinen; gPatent LLC

(57) ABSTRACT

A transient blockchain proxy server consolidates many individual requests to add data to a blockchain by aggregating hashed data from these requests and sending the aggregated hashed data to the blockchain network as a single request. The blockchain network adds a new block to the blockchain with the aggregated hashed data and returns a transaction identifier for the new block to the transient blockchain proxy server, which passes the transaction identifier back to all the requestors who then can directly use the blockchain network to verify the hashed data using the transaction identifier. The transient blockchain proxy server buffers all incoming requests until one of the pending requests reaches a send timepoint that is the blockchain network delay plus a buffer time before a guaranteed time of verification. All incoming requests are then consolidated and sent as a single transaction to the blockchain network. Tiered verification-time services are enabled.

20 Claims, 21 Drawing Sheets

(56) References Cited

U.S. PATENT DOCUMENTS

| | | | |
|---|---|---|---|
| 2019/0058590 A1* | 2/2019 | Watanabe | G06Q 20/065 |
| 2019/0394192 A1* | 12/2019 | Kale | G06Q 20/3821 |
| 2020/0074389 A1* | 3/2020 | Mohammad | G06Q 30/0601 |
| 2020/0184473 A1* | 6/2020 | Fang | H04L 9/3236 |
| 2020/0213090 A1 | 7/2020 | Gupta | |
| 2020/0213094 A1* | 7/2020 | Yang | H04L 9/3297 |
| 2020/0259918 A1* | 8/2020 | Luft | H04L 67/568 |
| 2020/0366489 A1* | 11/2020 | Assenmacher | H04L 9/3231 |
| 2020/0382280 A1* | 12/2020 | Jayachandran | G06Q 20/382 |
| 2021/0042803 A1* | 2/2021 | Achkir | G06K 7/1413 |
| 2021/0105224 A1* | 4/2021 | Murray | H04L 47/783 |
| 2021/0144517 A1* | 5/2021 | Guim Bernat | H04L 41/0869 |
| 2021/0194672 A1* | 6/2021 | Narayanam | G06F 3/0611 |
| 2021/0297253 A1* | 9/2021 | Irazabal | G06F 16/2365 |
| 2021/0314331 A1* | 10/2021 | Singh | G06F 21/6245 |
| 2022/0005022 A1* | 1/2022 | Tu | G06Q 20/02 |
| 2022/0021662 A1 | 1/2022 | Wright et al. | |
| 2022/0270725 A1* | 8/2022 | DeRosa-Grund | H04L 67/104 |
| 2022/0292202 A1* | 9/2022 | Manevich | G06F 21/53 |
| 2022/0351192 A1* | 11/2022 | McGregor | G06Q 20/3827 |
| 2023/0102726 A1* | 3/2023 | Collins | G06F 21/64 713/193 |
| 2023/0105224 A1* | 4/2023 | Taylor | A61B 17/221 606/127 |
| 2023/0120160 A1* | 4/2023 | Oh | H04L 63/0815 726/5 |

FOREIGN PATENT DOCUMENTS

| | | |
|---|---|---|
| CN | 111382164 A | 7/2020 |
| WO | WO2019233123 A | 12/2019 |

* cited by examiner

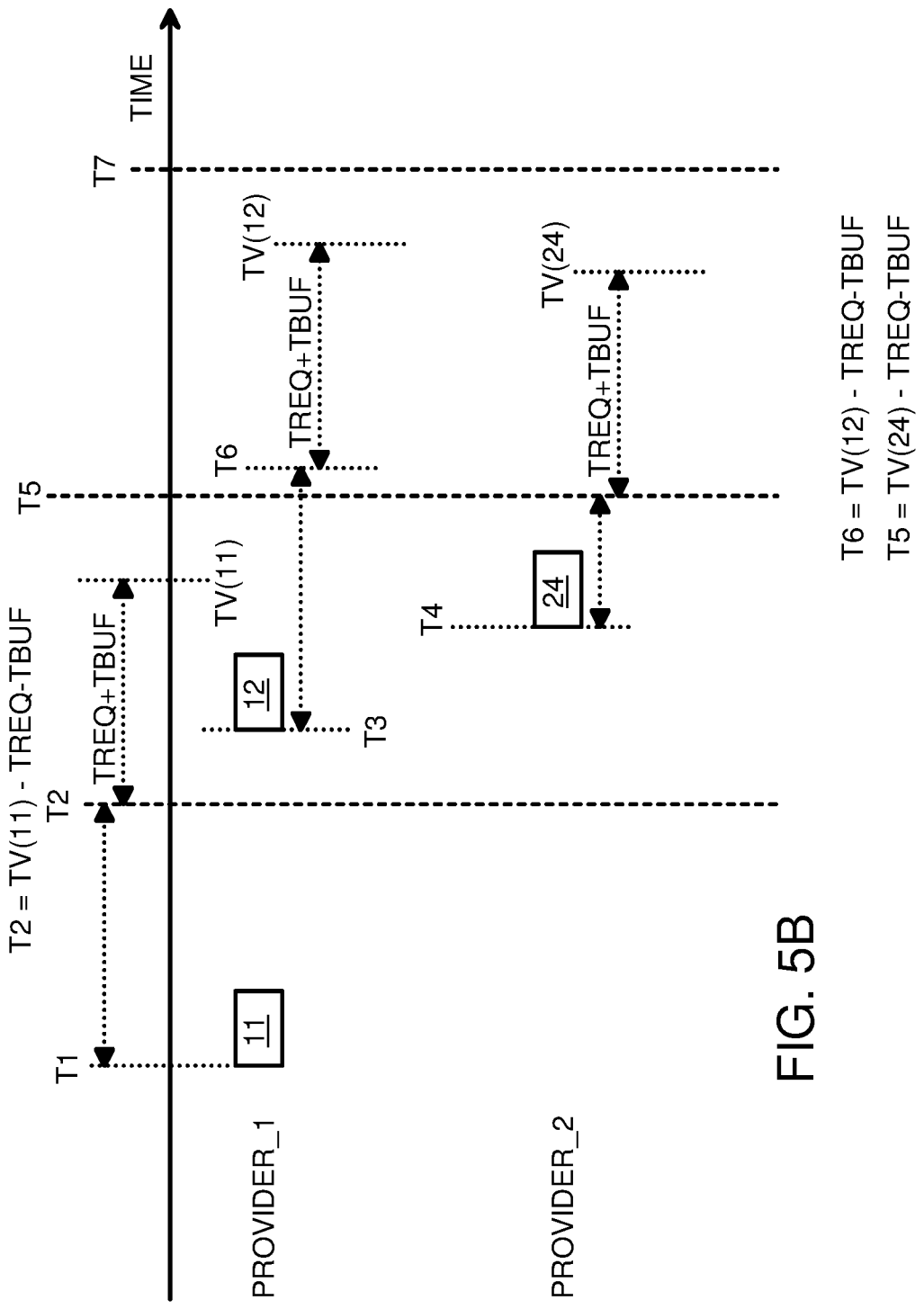

260

[
{ PROVIDER_1, DATA_11_ID, HASH(DATA_11), TV_11 },
{ PROVIDER_1, DATA_12_ID, HASH(DATA_12), TV_12 },
{ PROVIDER_2, DATA_21_ID, HASH(DATA_21), TV_21 },
{ PROVIDER_2, DATA_22_ID, HASH(DATA_22), TV_22 },
]

| PROVIDERS AND DATA ID'S: | PROVIDER_1: [<br>DATA_11_ID,<br>DATA_12_ID,<br>]<br>PROVIDER_2: [<br>DATA_21_ID,<br>DATA_22_ID,<br>] |
|---|---|
| AGGRGATED HASHES: | [ HASH(DATA_11), HASH(DATA_12), HASH(DATA_21), HASH(DATA_22) ] |

FIG. 6B

| TxID_1 | TRANSACTION DATA: [ HASH(DATA_11), HASH(DATA_12), HASH(DATA_21), HASH(DATA_22) ] | ~264 |

FIG. 6C

| PROVIDER: | TRANSACTION ID: | DATA ID: |
|---|---|---|
| PROVIDER_1 | TxID_1 | DATA_11_ID, DATA_12_ID |
| PROVIDER_2 | TxID_1 | DATA_21_ID, DATA_22_ID |

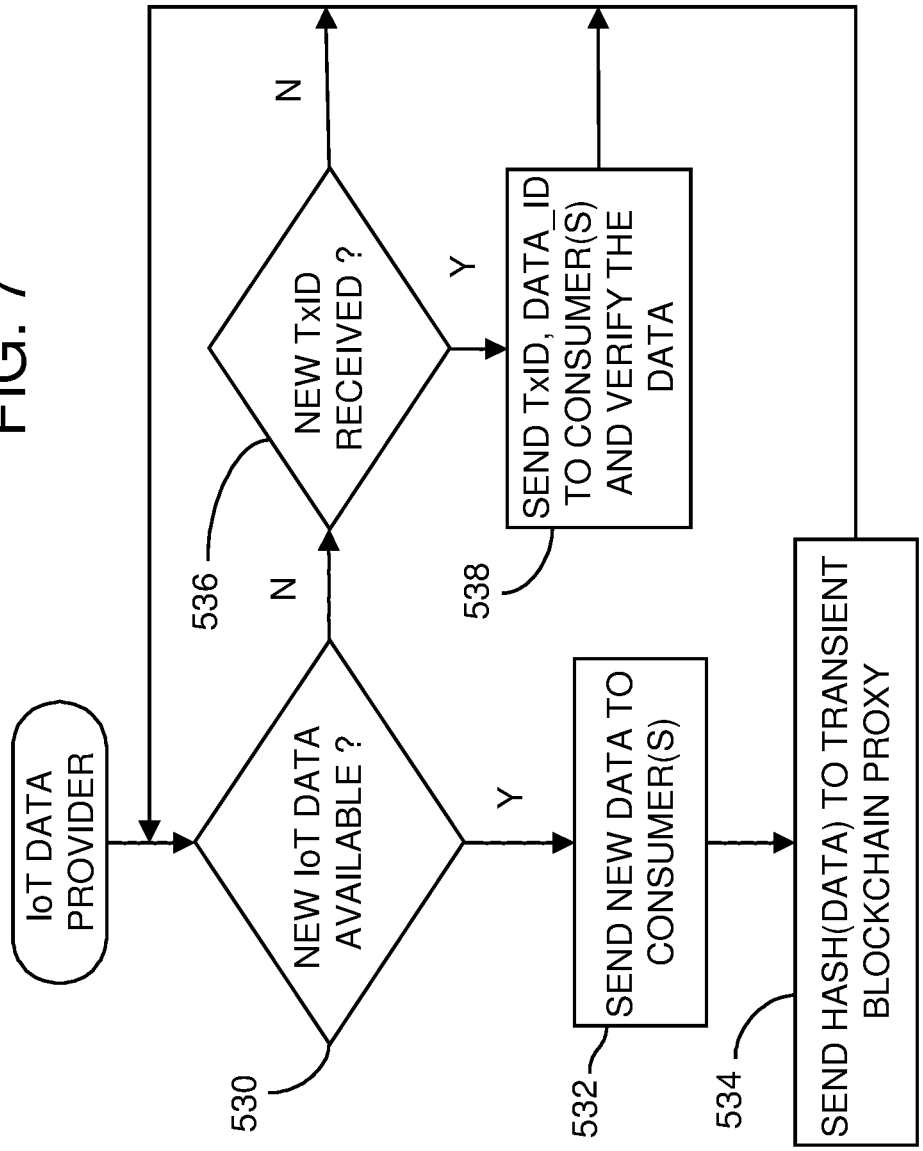

OPTIMIZING DATA TRANSACTIONS AND VERIFICATION ON A BLOCKCHAIN NETWORK

FIELD OF THE INVENTION

This invention relates to blockchain networks, and more particularly to data verification using blockchain networks.

BACKGROUND OF THE INVENTION

Blockchain technology has been widely used for cryptocurrencies such as Bitcoin. Blockchain technology can enable a trustless, decentralized public ledger that can be consulted to verify transactions. However, bitcoin can add only about 5 new transactions per second, and can have a latency of 60 minutes to confirm a transaction. The cost can be $2 per transaction, which is too expensive for many business applications.

FIG. 1 shows a blockchain. Data records or blocks 304, 305, 306 are linked together in a chain to form a distributed ledger that is replicated on many computer nodes that perform consensus or other verification methods to ensure that the blocks have not been altered.

Each block 304, 305, 306 contains a timestamp, data, a cryptographic hash of the previous block in the chain, and a hash of the current block. The hash of the current block is generated by including the hash of the prior block when generating the new hash. The timestamp proves that the data existed at the time of the block's creation.

For example, block 305 contains HASH_4 which is the hash from the prior block 304, linking block 305 back to block 304. Next block 306 contains HASH_5 of block 305, as well as its own hash HASH_6. Thus a chain of blocks are formed with hashes of prior blocks. These hashes cannot be altered without detection by the distributed computing network that manages the blockchain, providing data security and persistence. The blockchain nodes can perform various consensus algorithms and protocols to ensure that prior blocks cannot be altered, and that any altered blocks are detected and deleted. When 2 new blocks are added to the existing chain at the same time, forking algorithms can select one of the blocks for chain propagation while the other forked block becomes a dead end or orphan block.

The data in a block can include transaction data that is hashed for security and encoded into a data structure such as a Merkle tree. Blocks can be digitally signed, such as with a cryptographic private key, so that the data can be verified using a matching public key.

While permissionless or open blockchains such as bitcoin are common, private or permissioned blockchains such as Hyperledger are faster, allowing hundreds of transactions per second, with a much lower cost per transaction that bitcoin. The lower cost of these blockchain networks may enable a range of cost-sensitive business applications.

FIG. 2 shows a business application that uses a blockchain network to verify data. An Internet-of-Things (IoT) fleet tracking and monitoring system is used to track thousands of trucks. Each truck would send its GPS coordinates to a server, IoT data provider 102, periodically, such as each second. These GPS coordinates could then be sent from IoT data provider 102 to IoT data customer 104. However, data sent over the internet is subject to being hacked.

Instead, IoT data provider 102 generates a cryptographic hash of the GPS coordinate data and sends this data signature to blockchain network 106. Blockchain network 106 adds this data signature to the blockchain and sends a transaction identifier TxID back to IoT data provider 102 to acknowledge that the data signature was added to the blockchain successfully. IoT data provider 102 sends this TxID and the GPS coordinate data to IoT data customer 104.

IoT data customer 104 can verify the GPS coordinate data by sending the TxID to blockchain network 106, which uses the TxID to locate the data signature that was sent by IoT data provider 102 and stored by blockchain network 106. After reading the data signature from the blockchain, blockchain network 106 sends this data signature back to IoT data customer 104. IoT data customer 104 can generate a local copy of the cryptographic hash of the GPS coordinate data and compare this local hash to the hash received from blockchain network 106. If the hashes match, the GPS data is valid.

FIG. 3 highlights a bottleneck problem with the business application that uses a blockchain network to verify data of FIG. 2. Eventually, there may be many business applications for a variety of purposes besides GPS data that all use blockchain network 106. IoT data providers 102, 102', 102" all send requests with different data signatures to blockchain network 106. Blockchain network 106 may combine transactions into a single block, or it may generate a new block in the blockchain for each data signature received, so it can send a unique the transaction ID back to each of IoT data providers 102, 102', 102". Adding a new block to a blockchain can be very compute-intensive and slow. For example, the Bitcoin blockchain can process about 5 transactions per second, and it can take 10 or more minutes to receive confirmation. This is much too slow for GPS data since the truck can move within this period of time.

Non-public or permissioned blockchain networks can be faster. Public ledgers such as Hyperledger can handle hundreds of transactions per second, but the time for verification can vary and be hard to guarantee when congestion occurs. When all of IoT data providers 102, 102', 102" are simultaneously sending hashed data to the blockchain network, the blockchain network can be overwhelmed and have to delay processing of some of the requests. Verification requests can be delayed especially if the blockchain network prioritizes adding new blocks over verification, or does not guarantee a verification time.

The particular business application of truck GPS tracking requires fast verification of GPS data. The business application must be able to guarantee that the data can be verified in a particular amount of time, such as 1 minute or less, or the business application has little or no value to trucking companies. Some trucking companies may be willing to pay more for faster guaranteed verification times while other companies would rather pay less for a slower verification time guarantee.

What is desired is a tiered verification-time guarantee of business data stored on a blockchain. An IoT data provider that stores hashed data on a blockchain and can guarantee verification time is desirable. A blockchain proxy that consolidates data streams from different IoT data providers is desired to reduce the number of blocks added to the blockchain and thus reduce computational load on the blockchain network.

BRIEF DESCRIPTION OF THE DRAWINGS

FIGS. 5A-5C show timing diagrams of aggregating blockchain transactions by the transient blockchain proxy server.

FIGS. 6A-6D show data structures used by the transient blockchain proxy server to consolidate data hashes into a single blockchain transaction.

FIG. 7 is a flowchart of operation of an IoT data provider.

DETAILED DESCRIPTION

The present invention relates to an improvement in data verification using blockchain networks. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that a transient blockchain proxy server can be used to consolidate blockchain transactions from various IoT data providers to reduce bottlenecks. Verification times can be guaranteed if the maximum load on the blockchain network is reduced so that the blockchain network does not get overloaded.

Figure 4:
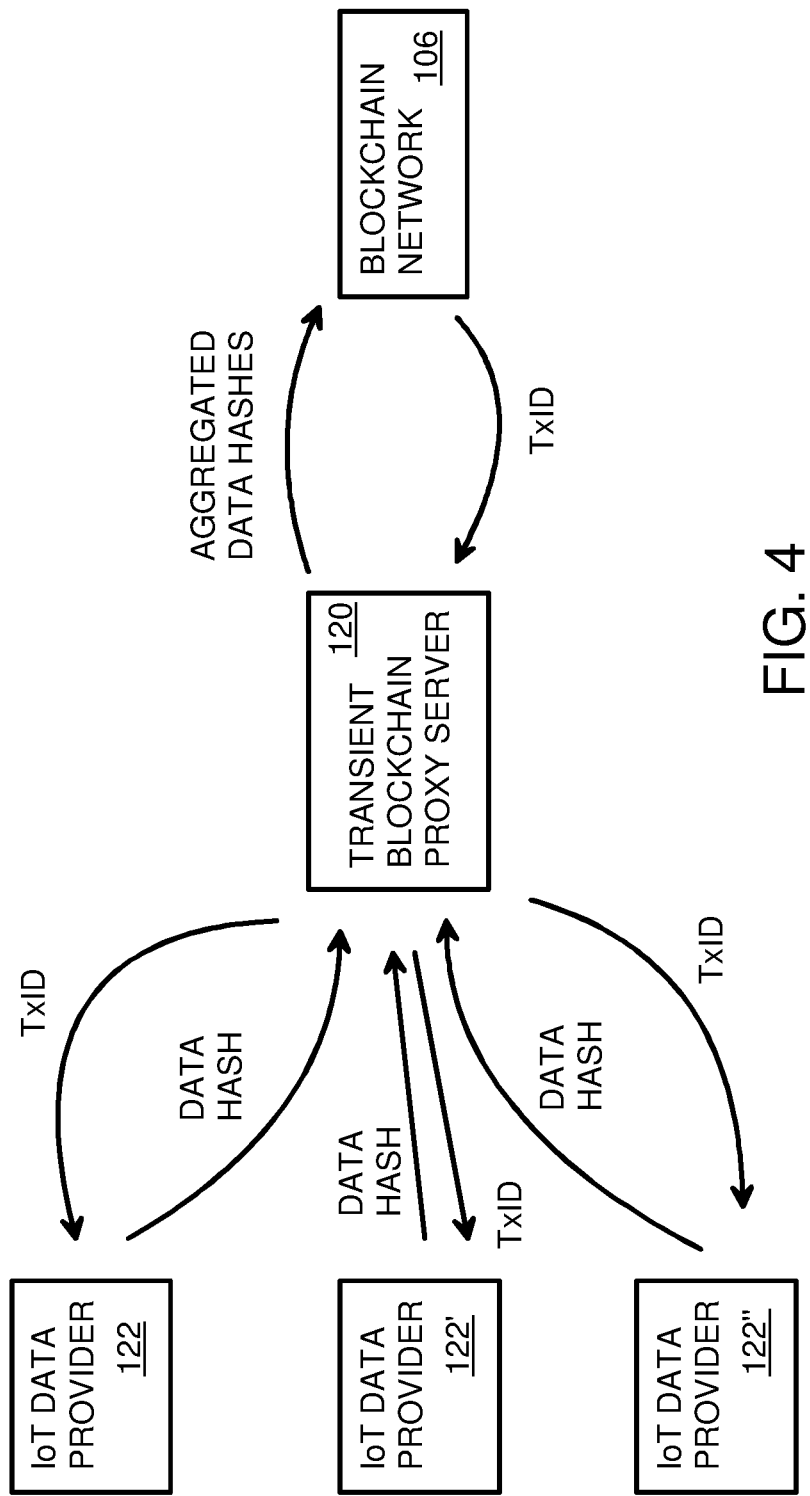
FIG. 4 shows a transient blockchain proxy server that consolidates transactions from one or more IoT data providers.

FIG. 4 shows a transient blockchain proxy server that consolidates transactions from one or more IoT data providers. IoT data providers 122, 122', 122" may support or provide a variety of applications, including a business application that requires a guaranteed verification time such as a GPS trucking application. Rather than send hashed data directly to blockchain network 106, IoT data providers 122, 122', 122" send their hashed data to transient blockchain proxy server 120. Transient blockchain proxy server 120 waits a period of time and consolidates all incoming hashed data until a time limit is reached. Then transient blockchain proxy server 120 generates a single blockchain transaction that contains all of the hashed data received during the time period. Blockchain network 106 receives this aggregated hashed data and stores it to the blockchain in a single new block that is added to the blockchain.

Blockchain network 106 returns a single transaction ID, TxID, to transient blockchain proxy server 120. This TxID is for the aggregated data hashes. Transient blockchain proxy server 120 sends this TxID to all of IoT data providers 122, 122', 122" for all of the transactions received during the time period.

Processing on the blockchain is greatly reduced since blockchain network 106 only has to process one blockchain transaction and only has to add one block to the blockchain for all of the aggregated transactions. While the size of the aggregated data hashes will be larger than any of the separate data hashes, each block on the blockchain can store a large amount of data so it is unlikely that blockchain network 106 will have to split the aggregated data hashes into 2 separate blocks.

Figure 5A:
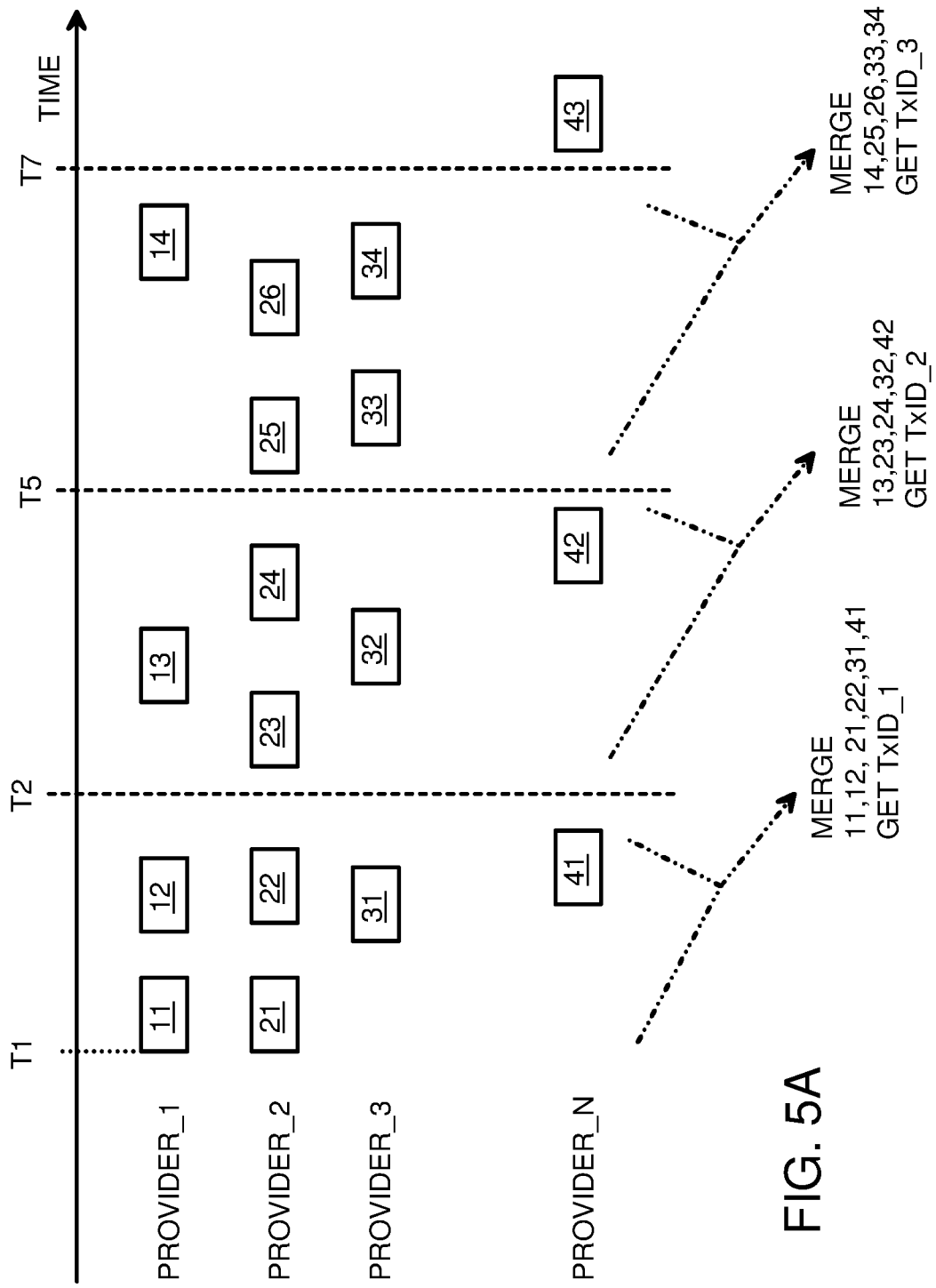
Figure 5C:
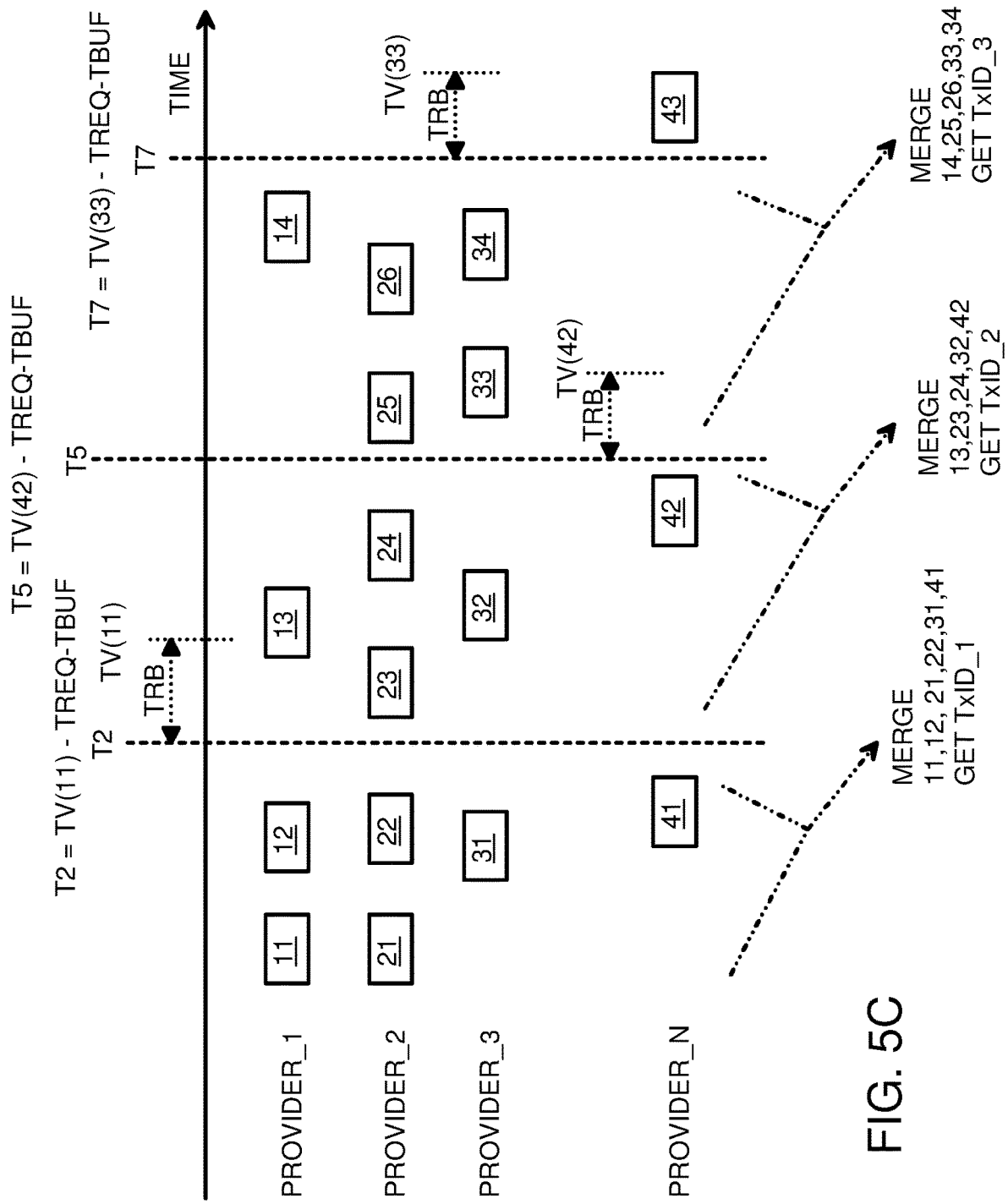

FIGS. 5A-5C show timing diagrams of aggregating blockchain transactions by transient blockchain proxy server 120. In FIG. 5A, there are N IoT data providers 102, PROVIDER_1, PROVIDER_2, PROVIDER_3, . . . PROVIDER_N.

Provider_1 generates hashed data 11 at time T1, and hashed data 12, 13, 14 at later times. Provider_2 generates hashed data 21 at time T1, hashed data 22 before time T2, hashed data 23, 24 between times T2 and T5, and hashed data 25, 26 between times T5 and T7. Provider_3 generates hashed data 31 before time T2, hashed data 32 before time T5, and hashed data 33, 34 between times T5 and T7. Provider_N generates hashed data 41 before time T2, hashed data 42 before time T5, and hashed data 43 after time T7.

Transient blockchain proxy server 120 consolidates all data hashes between time T1 and T2, and merges hashed data 11, 12, 21, 22, 31, and 41 to form the aggregate hashed data sent to blockchain network 106. The single transaction ID generated by blockchain network 106, TxID 1, is used for the transactions of hashed data 11, 12, 21, 22, 31, and 41 and is returned to IoT data providers 122, 122', 122" . . . for each of the 6 transactions.

After the hashed data is aggregated at time T2, transient blockchain proxy server 120 waits until time T5, consolidating all incoming transactions and their hashed data 13, 23, 24, 32, 42. At or around time T5, transient blockchain proxy server 120 sends the aggregated hashed data to blockchain network 106 as a single transaction and receives transaction ID TxID 2 from blockchain network 106 to indicate which block that was added to the blockchain contains the aggregate hashed data 13, 23, 24, 32, 42.

After time T5, transient blockchain proxy server 120 again consolidates all incoming hashed data 14 from PROVIDER_1, hashed data 25, 26 from PROVIDER_2, and hashed data 33, 34 from PROVIDER_3 until time T7 is reached. Then transient blockchain proxy server 120 sends the aggregated hashed data 14, 25, 26, 33, 34 to blockchain network 106, which adds this aggregated data to the blockchain and returns transaction ID TxID 3, which can be used to locate the aggregate hashed data on the blockchain.

While the time periods T2-T1, T5-T2, T7-T5, etc. could be a fixed period of time, the time periods can also be variable. Variable time periods of data aggregation can better optimize the system, especially for tiered services.

In FIG. 5B, a tiered data verification application allows customers to specify different tiers of service. For example, the lowest cost service may guarantee a data verification time of 10 seconds while a higher cost tier of service could guarantee a 2 second data verification time.

When each hashed data is received, transient blockchain proxy server 120 can calculate the guaranteed time of verification for that hashed data. For hashed data 11 from PROVIDER_1, the guaranteed time of verification is time TV(11). This is a fixed time point that depends on the time the data is received by transient blockchain proxy server 120 or is sent from IoT data provider 122. Each hashed data has its own guaranteed time of verification.

For hashed data 11 received at time T1, the service tier may specify a guaranteed time of verification of TV(11). For hashed data 24 received at time T4, the service tier may specify a guaranteed time of verification of TV(24). Note that TV(11)-T1 is much larger than TV(24)-T4, since PROVIDER_2 has a higher tier of service than does PROVIDER_1. Hashed data 24 from PROVIDER_2 must be processed more quickly than hashed data 11 from PROVIDER_1, since PROVIDER_2 likely paid more for the service than did PROVIDER_1.

Transient blockchain proxy server 120 must send the hashed data to blockchain network 106 and wait for blockchain network 106 to return the transaction ID before the guaranteed time of verification TV(x) has passed. Blockchain network 106 may require a time of TREQ to add the hashed data to the blockchain and may require a buffering time TBUF to return the transaction ID to transient blockchain proxy server 120. TBUF could also include buffering or other delays in transient blockchain proxy server 120.

In order to ensure that hashed data 11 can be verified by guaranteed time of verification TV(11), transient blockchain proxy server 120 must send hashed data 11 to blockchain network 106 by time T2. T2 is TREQ+TBUF less (earlier) than TV(11). Similarly, to ensure that hashed data 24 can be verified by guaranteed time of verification TV(24), transient blockchain proxy server 120 must send hashed data 24 to blockchain network 106 by time T5. T5 is TREQ+TBUF less (earlier) than TV(24).

Hashed data 12 is received at time T3. It has a guaranteed time of verification of TV(12). Subtracting necessary processing delays of TREQ and TBUF, hashed data 12 can wait until time T6=TV(12)-TREQ-TBUF. However, transient blockchain proxy server 120 needs to send hashed data 24 at time T5, which is before T6. Transient blockchain proxy server 120 can consolidate hashed data 12 with hashed data 24 when sending the aggregated hashed data at time T5. Hashed data 12 will receive slightly faster service that required.

FIG. 5C shows a more complex example of hashed data consolidation. Hashed data 11 is received first, and has a guaranteed time of verification of TV(11), which is earlier than the guaranteed time of verification of any other hashed data 12, 21, 22, 31, 41 received before time T2. Thus hashed data 11 determines T2, which is T2=TV(11)-TREQ-TBUF=TV(11)-TRB, where TRB=TREQ+TBUF.

After T2, hashed data 13, 23, 24, 32, and 42 are received. However, PROVIDER_N has a higher tier of service than other customers or providers, so hashed data 42 determines T5 when the aggregated hashed data must be sent to blockchain network 106. TV(42) is earlier than TV(13), TV(23), TV(24), or TV(32). T5 is calculated as TV(42)-TRB. When T5 is reached, transient blockchain proxy server 120 aggregates hashed data 13, 23, 24, 32, and 42 and sends the aggregated hashed data to blockchain network 106 as a single transaction. Blockchain network 106 stores this aggregated hashed data into a new block on the blockchain and returns the transaction ID, TxID 2, to transient blockchain proxy server 120, which returns TxID 2 to IoT data providers 122, 122', 122" that sent hashed data 13, 23, 24, 32, and 42.

After T5, hashed data 14, 25, 26, 33, 34 are received. For these, the earliest guaranteed time of verification is TV(33) for PROVIDER_3, which has a faster service tier than PROVIDER_1 and PROVIDER_2. T7 is set by TV(33) as T7=TV(33)-TRB. At time T7, transient blockchain proxy server 120 merges hashed data 14, 25, 26, 33, 34 and sends it to blockchain network 106 which returns TxID 3.

Blockchain processing is greatly reduced by transient blockchain proxy server 120 since hashed data 14, 25, 26, 33, 34 are combined into a single blockchain transaction, rather than consuming 5 separate blockchain transactions. The time period for aggregating transactions is variable as it depends on the service tiers and timing of incoming hashed data transactions. Transient blockchain proxy server 120 flexibly adjusts to the guaranteed time of verification for each incoming hashed data packet, delaying sending the hashed data to blockchain network 106 until required by the verification times of the currently-buffered hashed data packets.

FIGS. 6A-6D show data structures used by the transient blockchain proxy server to consolidate data hashes into a single blockchain transaction. In FIG. 6A, transient blockchain proxy server 120 has received four hashed data packets and has listed them in data structure 260. Each record in data structure 260 includes the provider identifier or name, an identifier or pointer to the data itself, Data_ID, a hash of the data, and the guaranteed time of verification TV. Data structure 260 can continue to grow as new hashed data packets are received by transient blockchain proxy server 120 and additional records are added to data structure 260. A new data structure 260 can be used for each time period of aggregating hashed data packets.

In FIG. 6B, at the time that the aggregated hashed data is sent to blockchain network 106, data structure 260 can be read by transient blockchain proxy server 120 to generate table 262. Table 262 has the hashed data grouped by provider, to link each provider and their hashed data.

When the hashed data is ready to be sent to blockchain network 106 by transient blockchain proxy server 120, such as at time T2 in FIG. 5C, the hashed data can be merged together such as by aggregation or concatenation. This aggregated hash can be stored in table 262 and sent to blockchain network 106.

After blockchain network 106 stores the hashed data on the blockchain and returns the transaction ID, TxID 1, this transaction ID can be stored by transient blockchain proxy server 120 in transaction table 264 shown in FIG. 6C. Transaction table 264 associates the hashed data with the transaction ID received from blockchain network 106.

In FIG. 6D, transient blockchain proxy server 120 creates transaction lookup table 266. Each record in transaction lookup table 266 lists the provider, transaction ID, and data pointer associated with that provider and aggregated transaction. Note that two records can have the same transaction ID since the hashed data from different providers is aggregated into a single transaction.

FIG. 7 is a flowchart of operation of an IoT data provider. IoT data providers 122, 122', 122" can each perform the operations shown in FIG. 7. An IoT data provider 122, 122', 122" can each have one or more customers of a tiered data service, and IoT data providers 122, 122', 122" can each provide a different service to a different group of customers.

When new data becomes available, such as new GPS data from a truck, step 530, this new data is sent to the customers registered for this service, step 532. IoT data provider 122 generates a cryptographic hash of the data, such as by using a private key in a public-private key pair. IoT data provider 122 sends this hashed data to transient blockchain proxy server 120, step 534.

As other new data is received by IoT data provider 122, this new data is also sent to customers, hashed, and the hash sent to transient blockchain proxy server 120, steps 530, 532, 534. Eventually transient blockchain proxy server 120 will respond with a new transaction ID, TxID that is received by IoT data provider 122, step 536. Transient blockchain proxy server 120 may also send a data identifier, Data_ID, to IoT data provider 122 so that IoT data provider 122 can match this TxID with the hashed data. IoT data provider 122 send the TxID and Data_ID to all consumers with data that was aggregated into the blockchain transaction matching the received TxID, step 538. IoT data provider 122 can also immediately verify the data, such as by looking up the hashed data in its local database and comparing the local hashed data to the hashed data read from the blockchain using TxID.

IoT data providers 122, 122', 122" can also calculate the guaranteed time of verification TV(x) from the service tier of the customer's data subscription plan, and from the hashed data packet's transmission time, and this TV(x) can be sent along with the hashed data in step 534.

Figure 8:
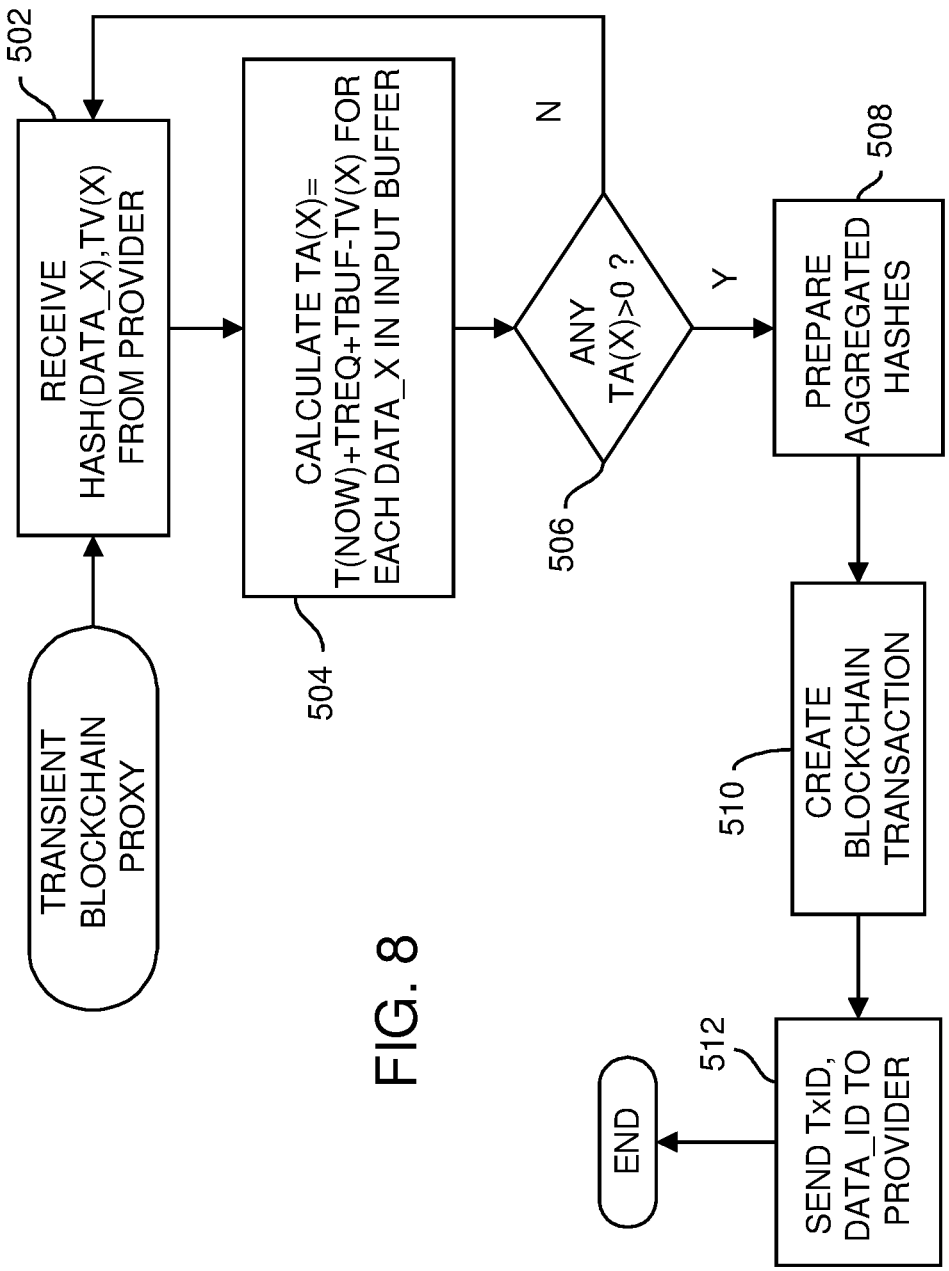
FIG. 8 is a flowchart of operation of the transient blockchain proxy server.

FIG. 8 is a flowchart of operation of the transient blockchain proxy server. When transient blockchain proxy server 120 receives a hashed packet from one of IoT data providers 122, 122', 122", step 502, it receives the hashed data HASH(DATA_X) and the guaranteed time of verification TV(x).

Transient blockchain proxy server 120 calculates the aggregation time TA(x) for all hashed data packets in its buffer, step 504. A different TA(x) is calculated for each of the hashed data packets still waiting in the buffer of transient blockchain proxy server 120 that have not yet been sent to blockchain network 106. TA(x) is calculated as the current time T(NOW) plus the processing time required by blockchain, TREQ, plus a buffer time TBUF, minus the guaranteed time of verification TV(x), or TA(x)=T(NOW)+TREQ+TBUF−TV(x).

Transient blockchain proxy server 120 waits as long as possible to send the buffered hashed data to blockchain network 106 until necessary due to the guaranteed time of verification for the new data and other data received. When none of the aggregation time TA(x) is positive (>0), step 506, transient blockchain proxy server 120 continues to accumulate hashed data received from IoT data providers 122, 122', 122", steps 502, 504, 506. However, once any one of the hashed data packets has an aggregation time TA(x) that is greater than zero, step 506, then buffering ends and transient blockchain proxy server 120 generates the aggregated hashed data, such as by concatenating the hashed data being buffered, step 508. A blockchain transaction is generated, step 510, such as by sending the aggregated hashed data to blockchain network 106 and waiting for blockchain network 106 to add the aggregated data to a block on the blockchain and return the transaction ID TxID. Then transient blockchain proxy server 120 sends the TxID to all providers having hashed data that is aggregated for this transaction, step 512. The Data_ID that is stored by transient blockchain proxy server 120, such as in transaction lookup table 266 (FIG. 6D), may also be sent with TxID, step 512.

Figure 1:
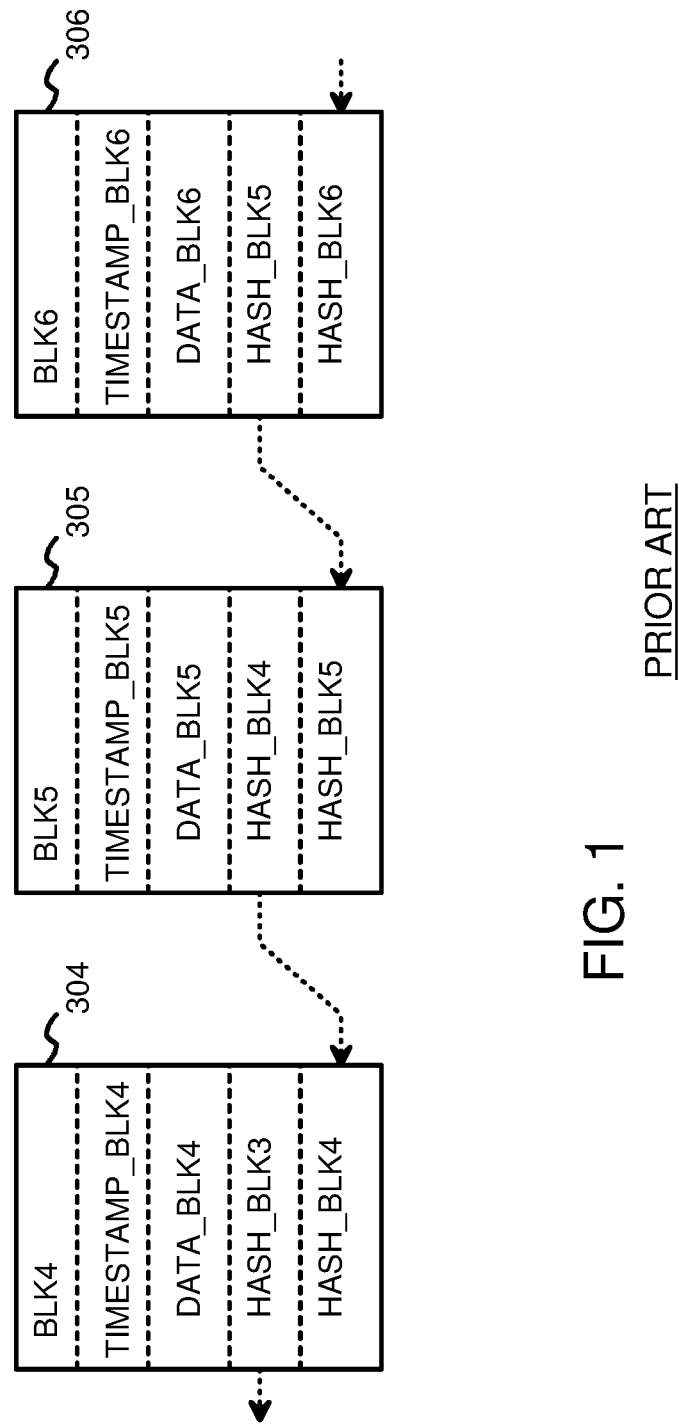
FIG. 1 shows a blockchain.
Figure 2:
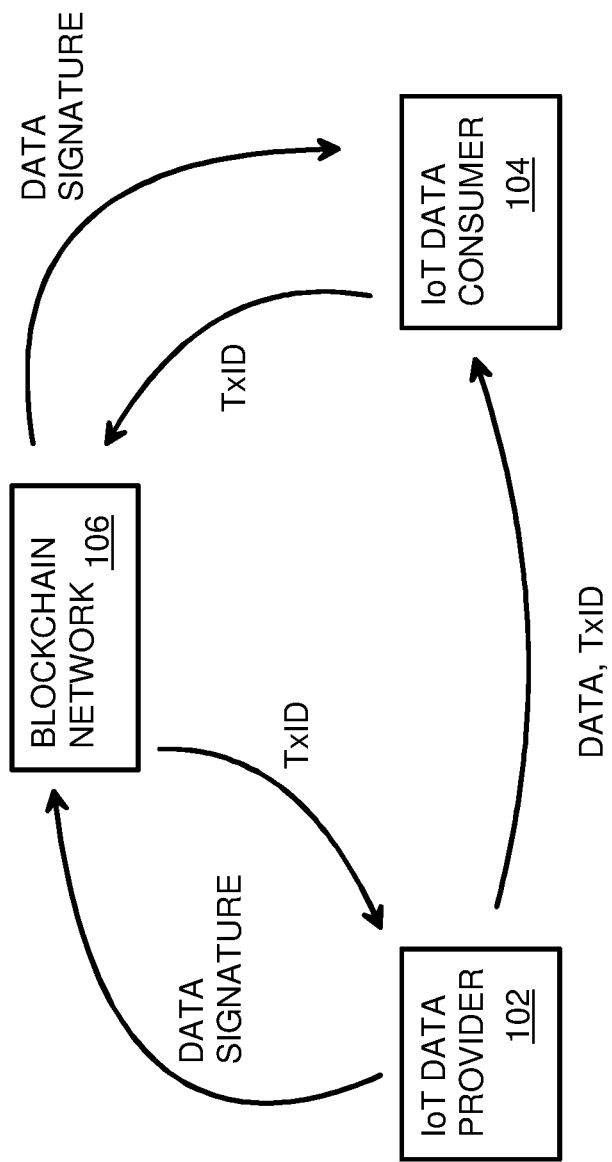
FIG. 2 shows a business application that uses a blockchain network to verify data.
Figure 3:
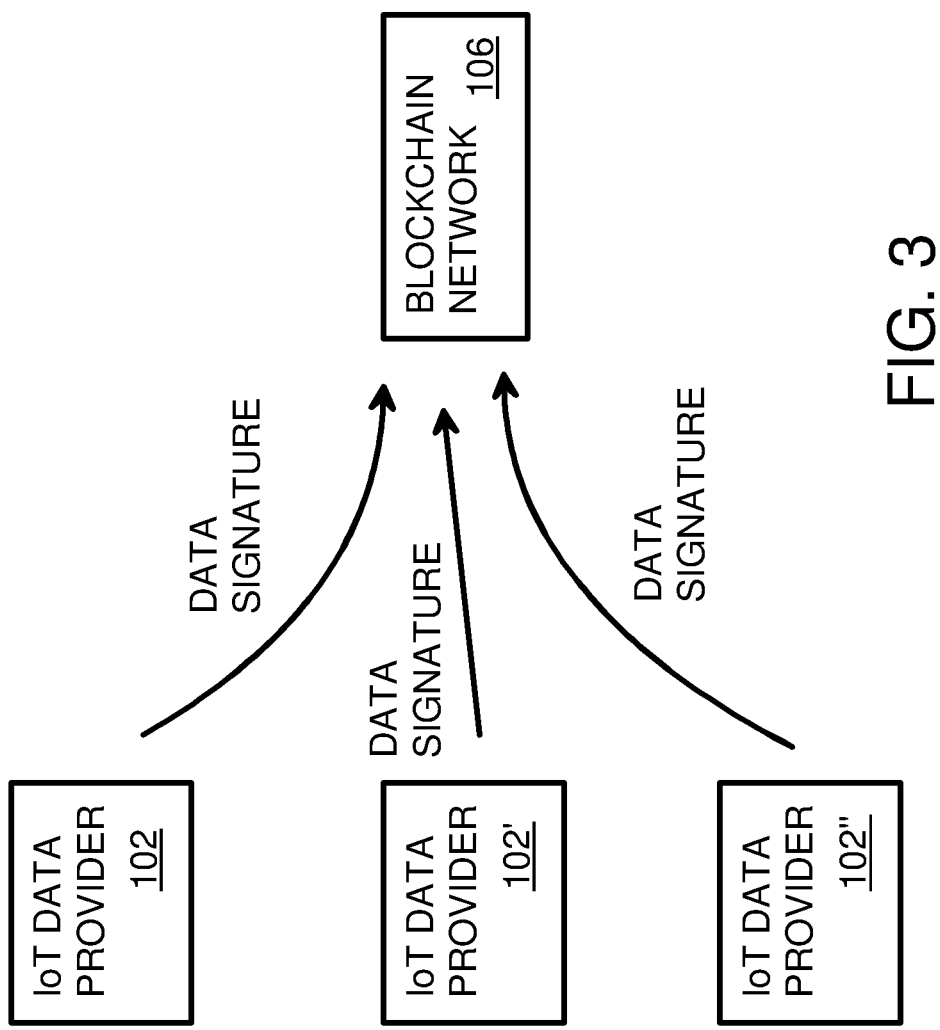
FIG. 3 highlights a bottleneck problem with the business application that uses a blockchain network to verify data of FIG. 2.
Figure 9:
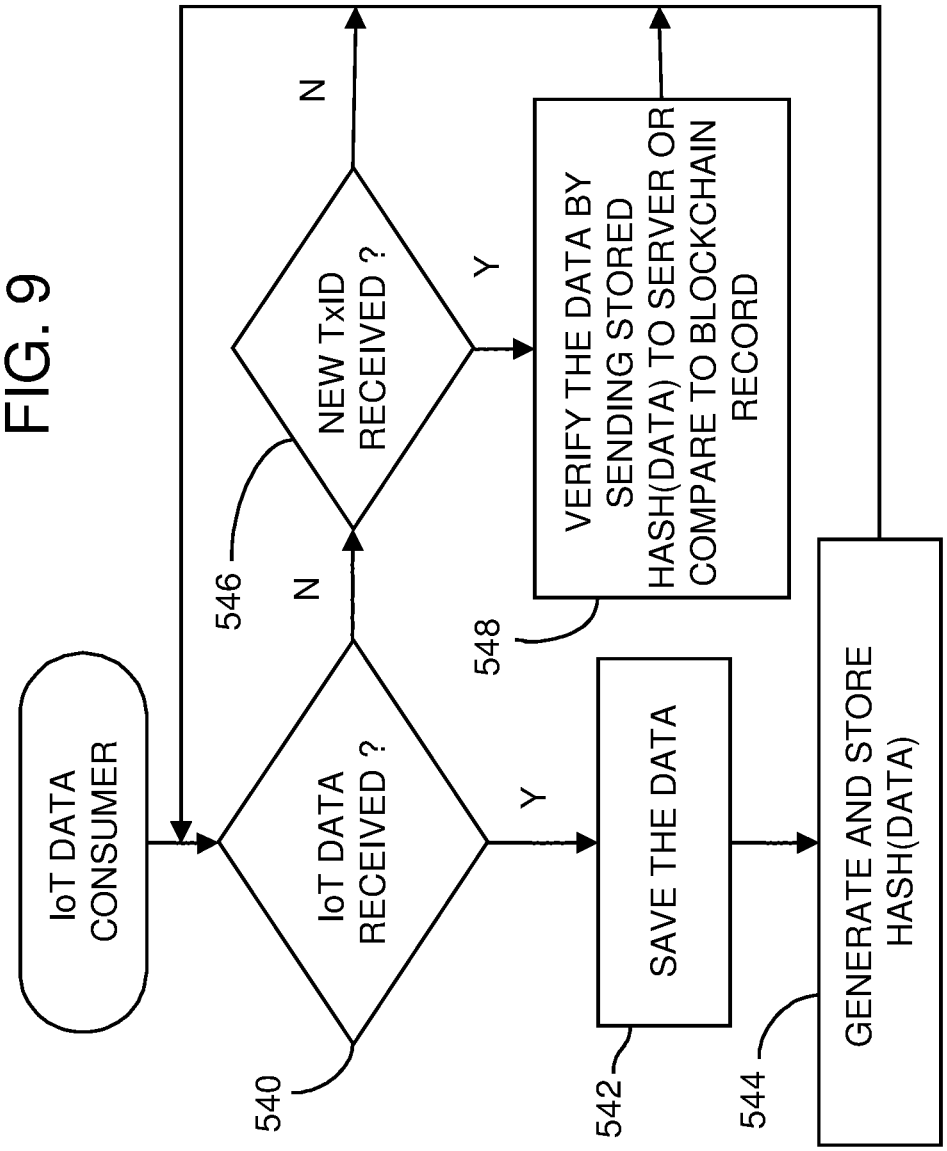
FIG. 9 is a flowchart of operation of the IoT data consumer.

FIG. 9 is a flowchart of operation of the IoT data consumer. Each of IoT data providers 122, 122', 122" may service many customers or consumers, such as many IoT data customer 104 (FIG. 2) feeding into each of IoT data providers 122, 122', 122" (FIG. 4). Each customer has one or more computer servers or other computer or communication equipment to perform the process of FIG. 9.

When new data becomes available from IoT data providers 122, 122', 122", such as new GPS data from a truck, step 540, this new data is saved by the customer, such as in a database or storage device. IoT data customer 104 generates a cryptographic hash of the data, such as by using a private key in a public-private key pair. IoT data provider 122 could provide this private key to the customer when the customer registers for service, and the customer can then store a local copy of this private key. IoT data customer 104 then stores this hash of the received data, step 544.

Eventually IoT data provider 122 will send the transaction ID, TxID, for the data, once blockchain network 106 adds the hashed data to the blockchain. When a new transaction ID and Data_ID is received, step 546, IoT data customer 104 matches this TxID and Data_ID with the hashed data and verifies the matched data by sending the stored hash together with the transaction ID to a blockchain verification node, step 548.

The blockchain verification node uses the transaction ID to locate the hashed data by finding the block matching the TxID, and then the blockchain verification node compares the hashed data received from IoT data customer 104 to the hashed data read from this block in the blockchain. When the hashed data from the customer is part of the hashed data in the block on the blockchain, the data verification is successful and the blockchain verification node sends the customer a success message. The blockchain verification node matches the hashed data to any subset of the hashed data read from the block identified by TxID within the blockchain.

Figure 10:
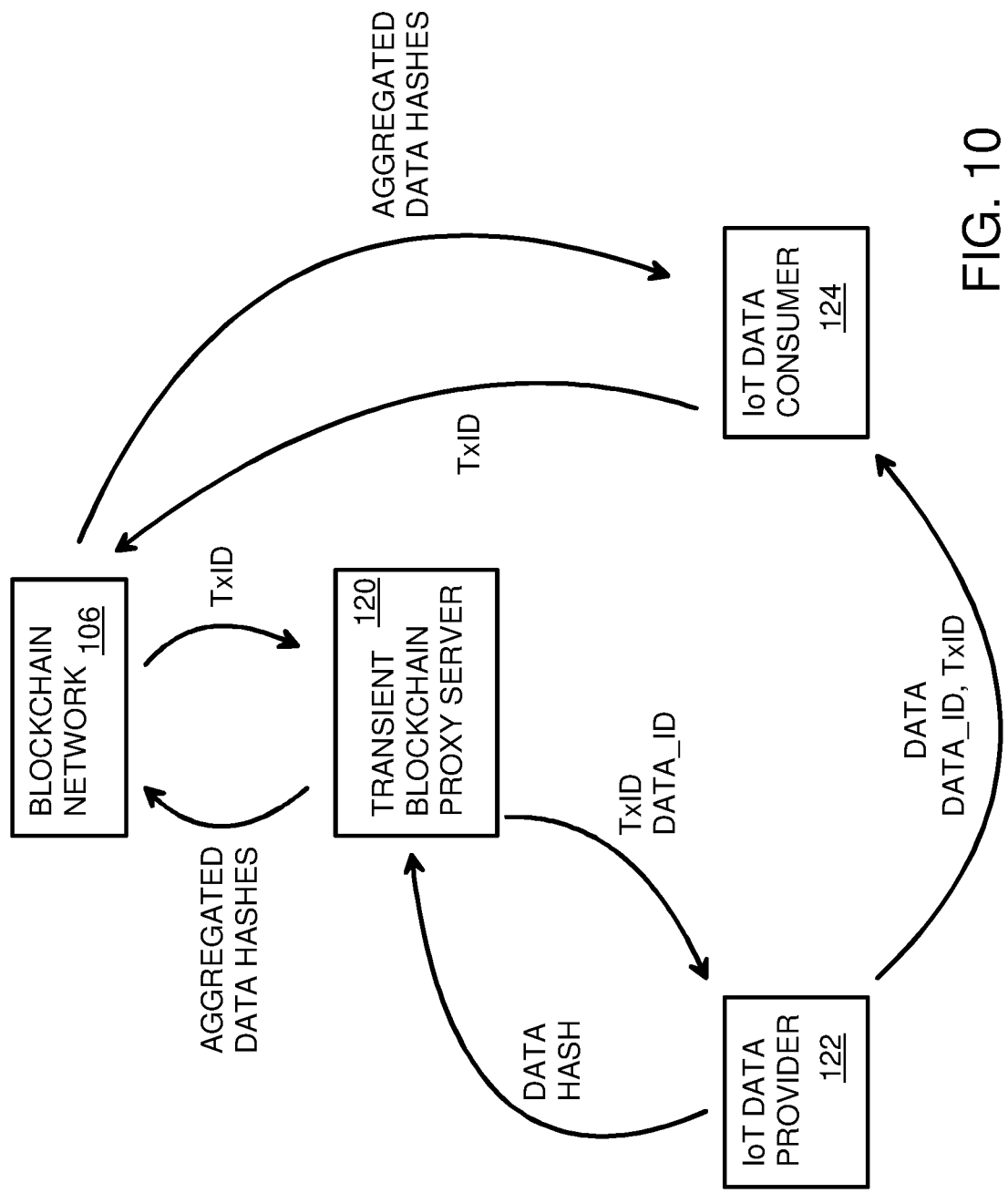
FIG. 10 shows messages communicated with the transient blockchain proxy server.

FIG. 10 shows messages communicated with the transient blockchain proxy server. IoT data provider 122 receives data, such as GPS tracking data, and generates a cryptographic hash of the data. IoT data provider 122, and other IoT data providers 122', 122" (not shown) send their hashed data to transient blockchain proxy server 120.

Transient blockchain proxy server 120 waits a period of time and buffers all incoming hashed data until a time limit is reached when all buffered hashed data is aggregated to form aggregated data hashes. Then transient blockchain proxy server 120 generates a single blockchain transaction that contains all of the hashed data received from any or all of IoT data providers 122, 122', 122" during the time period. Blockchain network 106 receives the aggregated data hashes and stores it to the blockchain in a single new block that is added to the blockchain.

Blockchain network 106 returns a single transaction ID, TxID, to transient blockchain proxy server 120. This TxID is for the aggregated data hashes. Transient blockchain proxy server 120 creates a new entry in transaction lookup table 266 for this new TxID to associate the TxID with the aggregated data hashes sent to blockchain network 106 to cause that TxID to be returned by blockchain network 106. Transient blockchain proxy server 120 can read table 262 to find the providers and Data_ID's that match the aggregated data hashes that were sent to blockchain network 106 and then use the TxID returned to fill the new entry in transaction lookup table 266 that associates TxID with the Data_ID for data that corresponds to the aggregated data hashes sent to blockchain network 106. Transient blockchain proxy server 120 sends this TxID to all of IoT data providers 122, 122', 122" along with the Data_ID's for that provider for all of the transactions received during the time period.

IoT data provider 122 sends this TxID and Data_ID and the unhashed data to IoT data customer 124.

IoT data customer 124 can verify this unhashed data received from IoT data provider 122 by sending the TxID to blockchain network 106. Blockchain network 106 sends this block's aggregated data hashes back to IoT data customer 124.

IoT data customer 124 can generate a local copy of the cryptographic hash of the data and compare this local hash to the hash received from blockchain network 106. If the local hash matches any portion of the aggregated data hashes, the data received from IoT data provider 122 is considered to be valid.

Figure 11A:
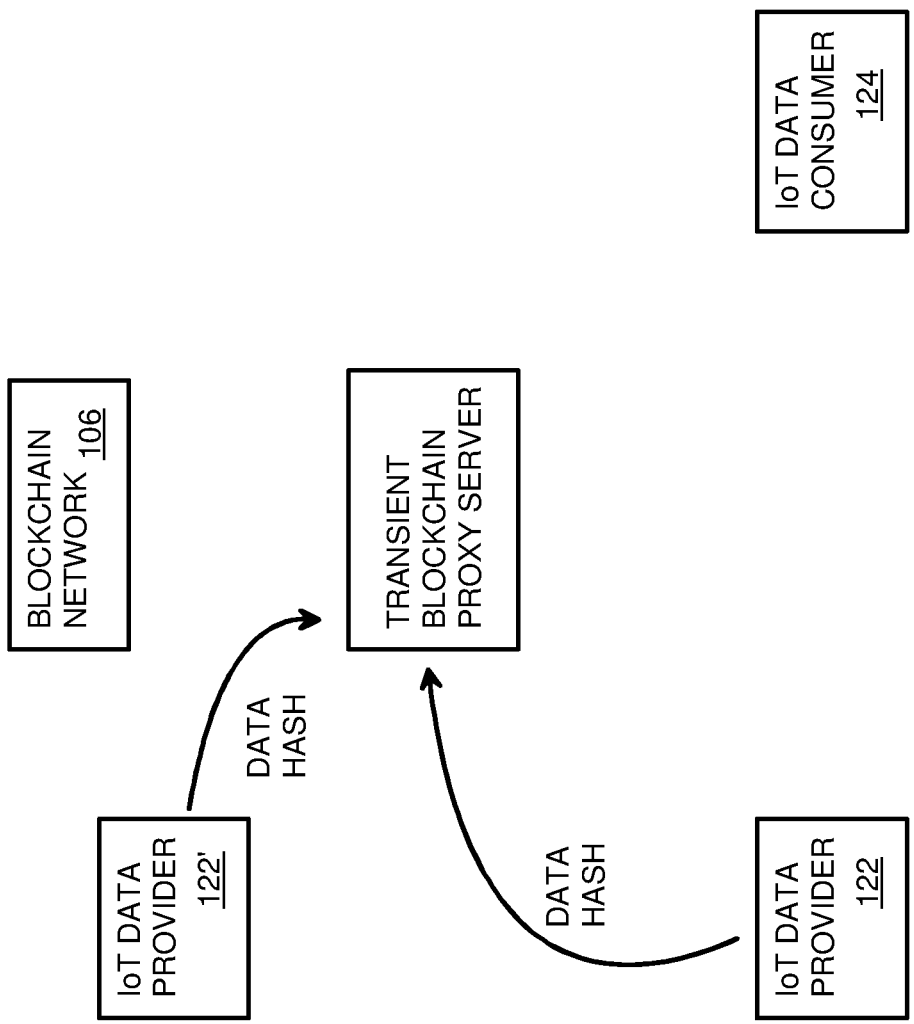
FIGS. 11A-11D show a sequence of operations of the data verification system with the transient blockchain proxy server.

FIGS. 11A-11D show a sequence of operations of the data verification system with the transient blockchain proxy server. In FIG. 11A IoT data provider 122 has received new data and sends a hash of the new data to transient blockchain proxy server 120, which also receives a data hash from other IoT data provider 122'. transient blockchain proxy server 120 buffers these data hashes until a time limit to ensure verification is reached.

Figure 11B:
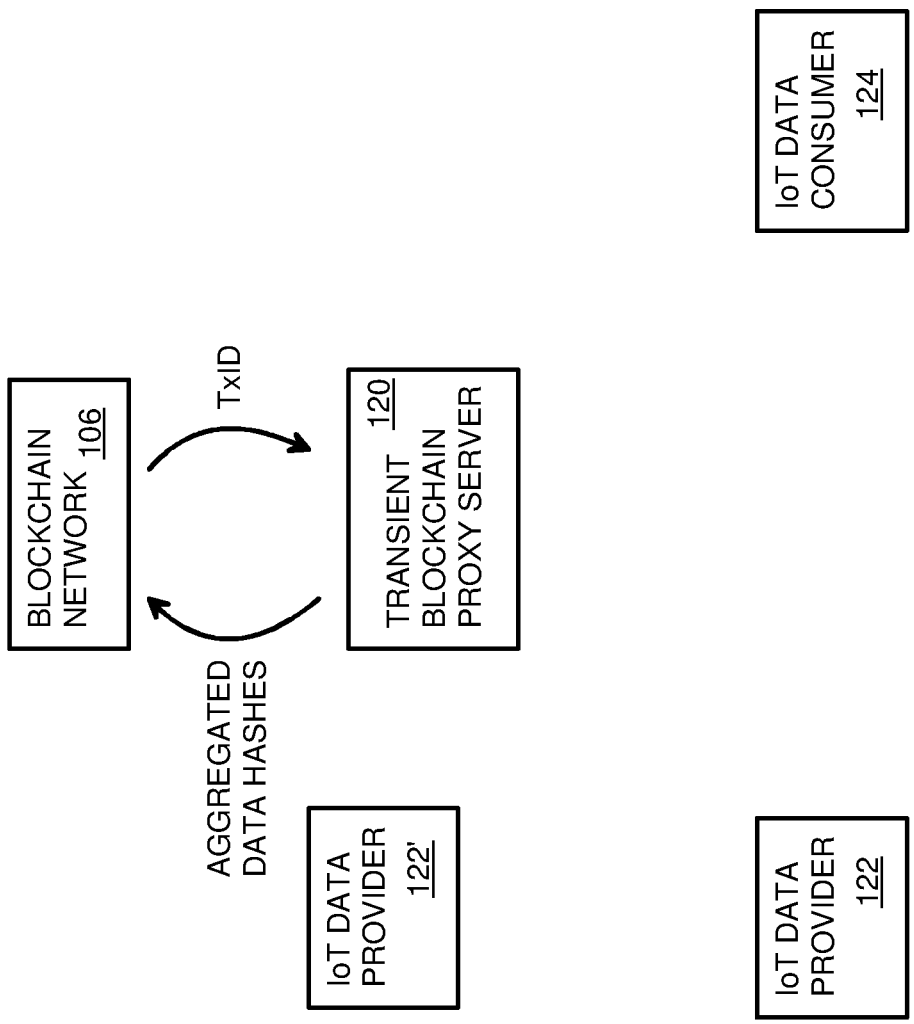

In FIG. 11B, the verification time limit is reached for one of the hashed data packets being buffered by transient blockchain proxy server 120. Transient blockchain proxy server 120 concatenates the data hashes together to form the aggregated data hash that is sent to blockchain network 106 in a request to add the aggregated data hash to the blockchain. Blockchain network 106 adds the aggregated data hash to the blockchain and returns the transaction ID, TxID, for the new block containing the aggregated data hash.

Figure 11C:
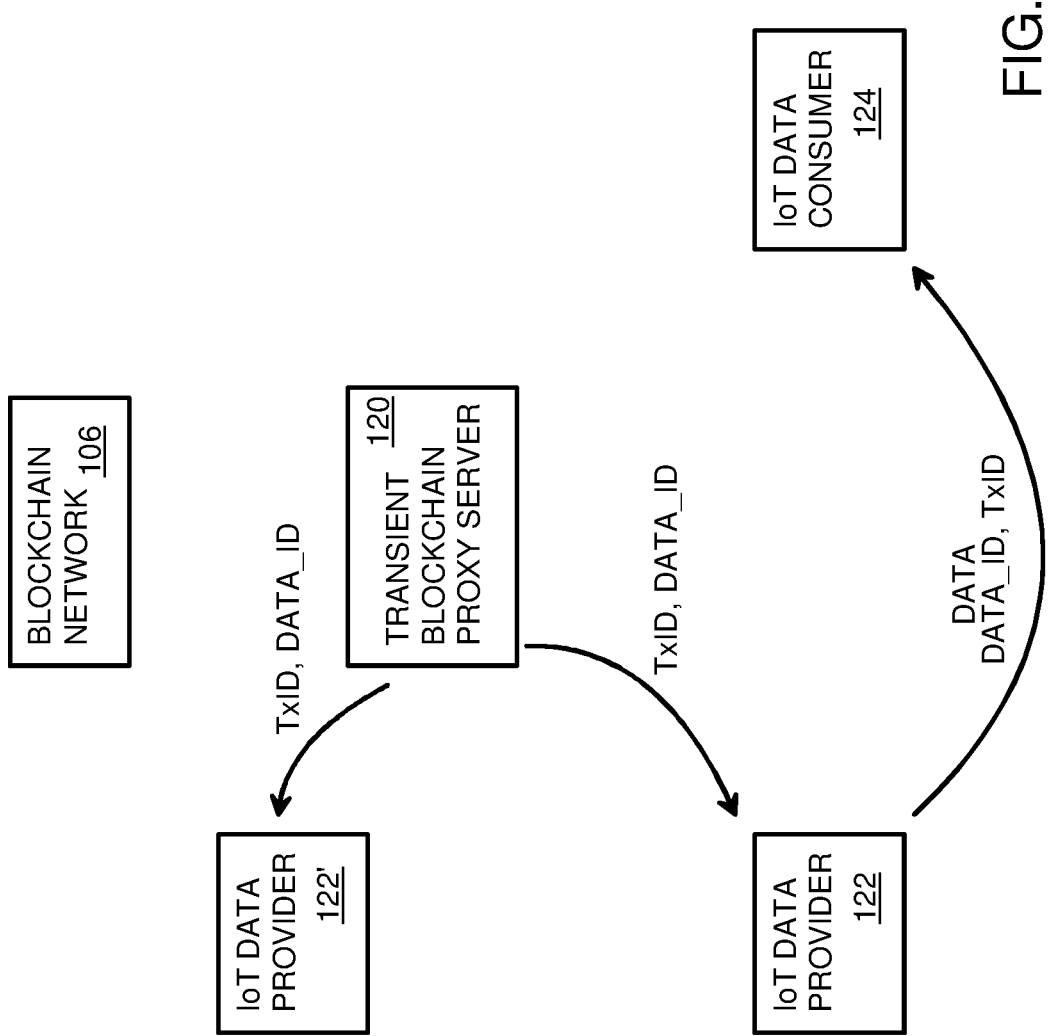

In FIG. 11C, transient blockchain proxy server 120 has received the TxID from blockchain network 106, and then sends this TxID and Data_ID to all IoT data providers 122, 122' that sent hashed data that was aggregated into the aggregated data hash sent to blockchain network 106 for transaction TxID.

Upon receiving TxID and Data_ID, IoT data provider 122 sends the unhashed data along with TxID and Data_ID to IoT data customer 124. IoT data provider 122 can maintain a lookup table to associate the unhashed data with the TxID and Data_ID and customers to send the data to.

Figure 11D:
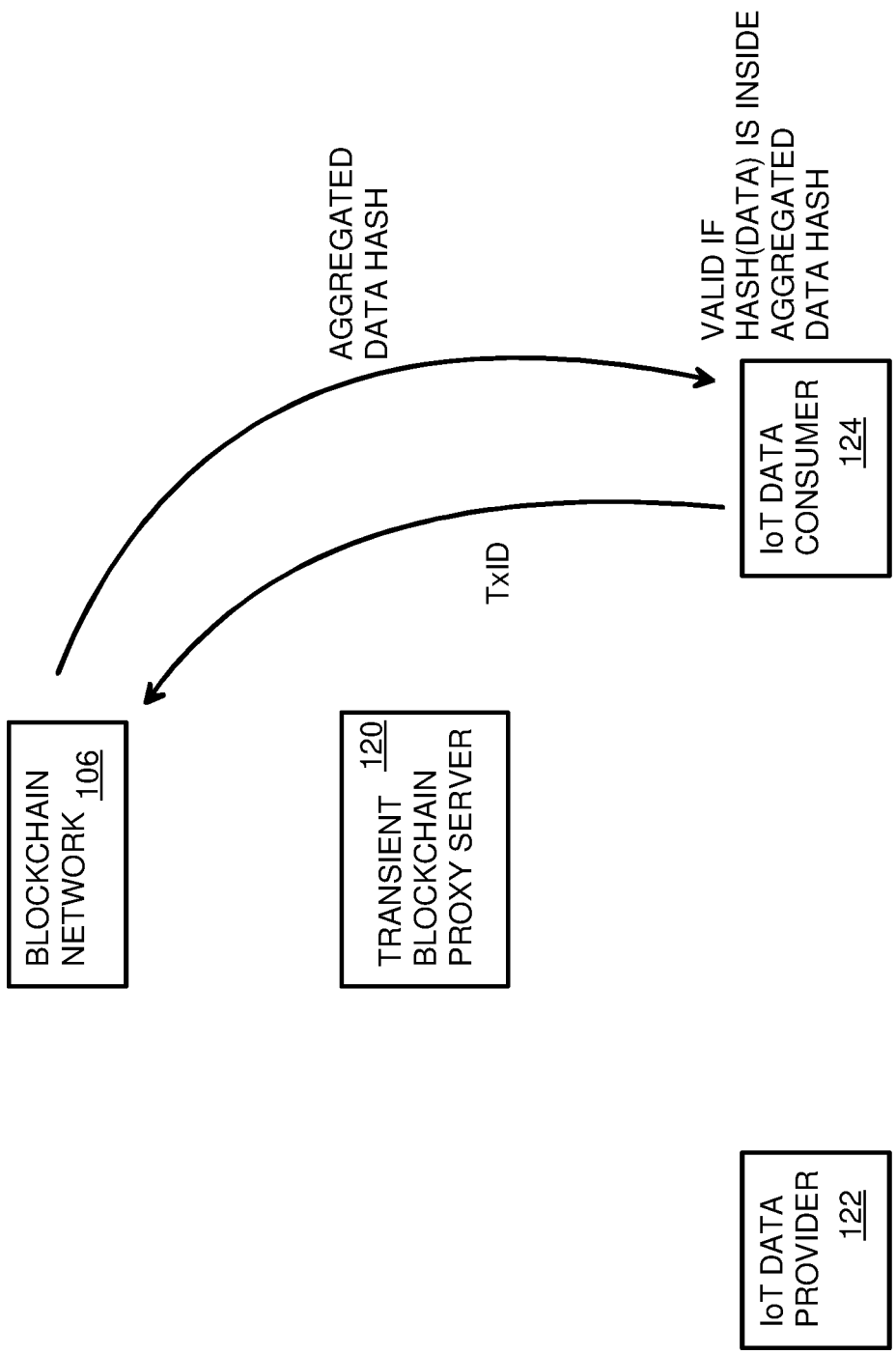

In FIG. 11D, IoT data customer 124 verifies the unhashed data received from IoT data provider 122. IoT data customer 124 uses the same cryptographic key to hash the data as was used by IoT data provider 122. The transaction ID, TxID, received from IoT data provider 122 is sent directly to blockchain network 106. Blockchain network 106 uses the TxID to read the aggregated hashed data from the block in the blockchain, and sends the aggregated data back to IoT data customer 124. Then IoT data customer 124 compares its local hash of the data to the aggregated data hash and signals successful verification when the local hash is found within the aggregated hash.

Figure 12:
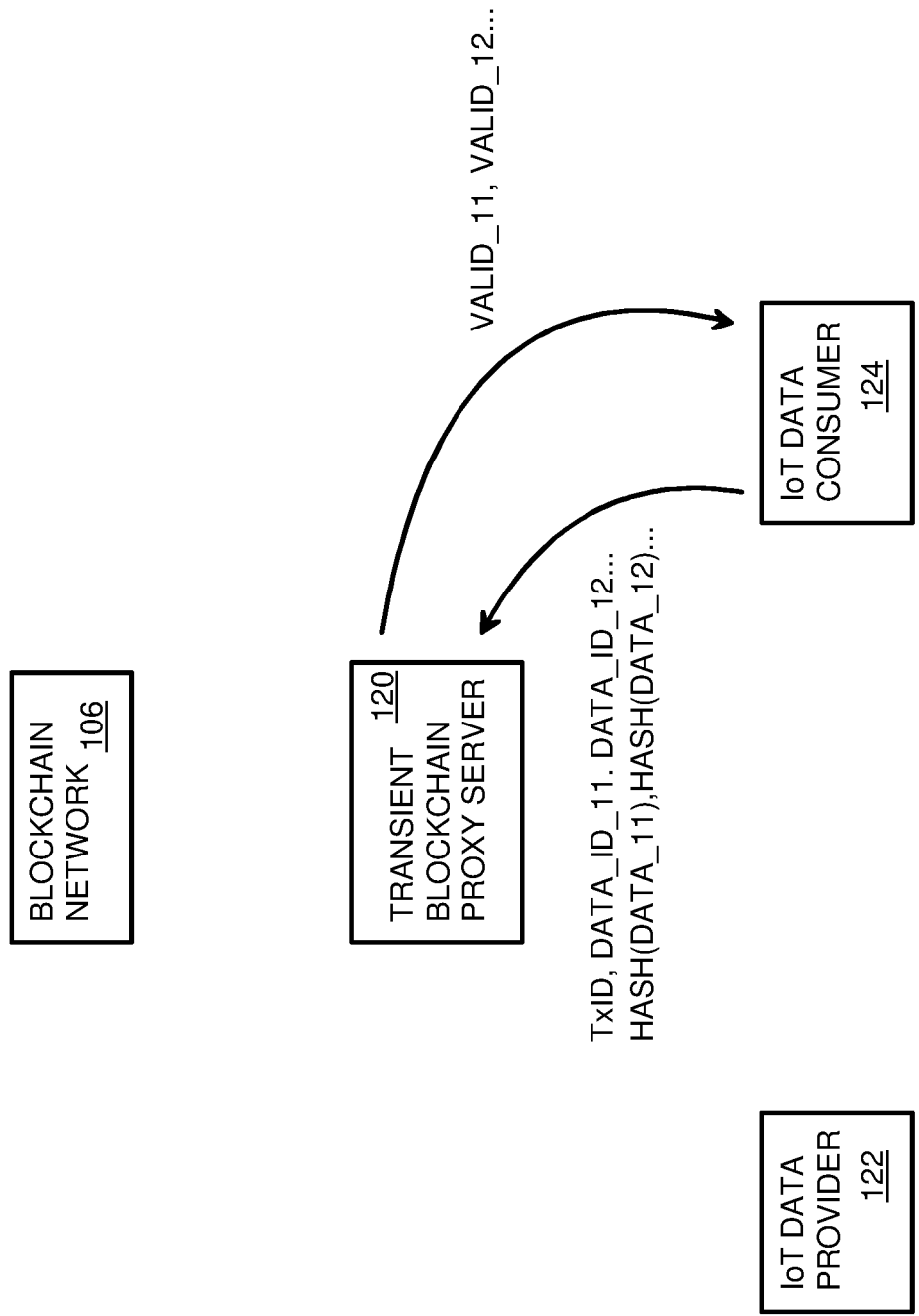
FIG. 12 shows using the transient blockchain proxy server to validate data.

FIG. 12 shows using the transient blockchain proxy server to validate data. In this alternative, transient blockchain proxy server 120 also provides a verification service. IoT data customer 124 has received the unhashed data from IoT data provider 122. IoT data customer 124 uses the same cryptographic key to hash the data as was used by IoT data provider 122. The hashed data and the transaction ID, TxID, and Data_ID received from IoT data provider 122 are sent to transient blockchain proxy server 120.

Transient blockchain proxy server 120 uses the TxID to read the aggregated hashed data from the block in the blockchain, and searches the aggregated data to see if the hashed data from IoT data customer 124 is found within the aggregated hashed data in the blockchain. If a match is found, transient blockchain proxy server 120 sends a verification message back to IoT data customer 124. Transient blockchain proxy server 120 can provide a batch verification service where IoT data customer 124 sends a list of TxID, Data_ID's, and hashed data, and transient blockchain proxy server 120 can generate a valid bit for each TxID, Data_ID, hashed data in the batch request.

Figure 13:
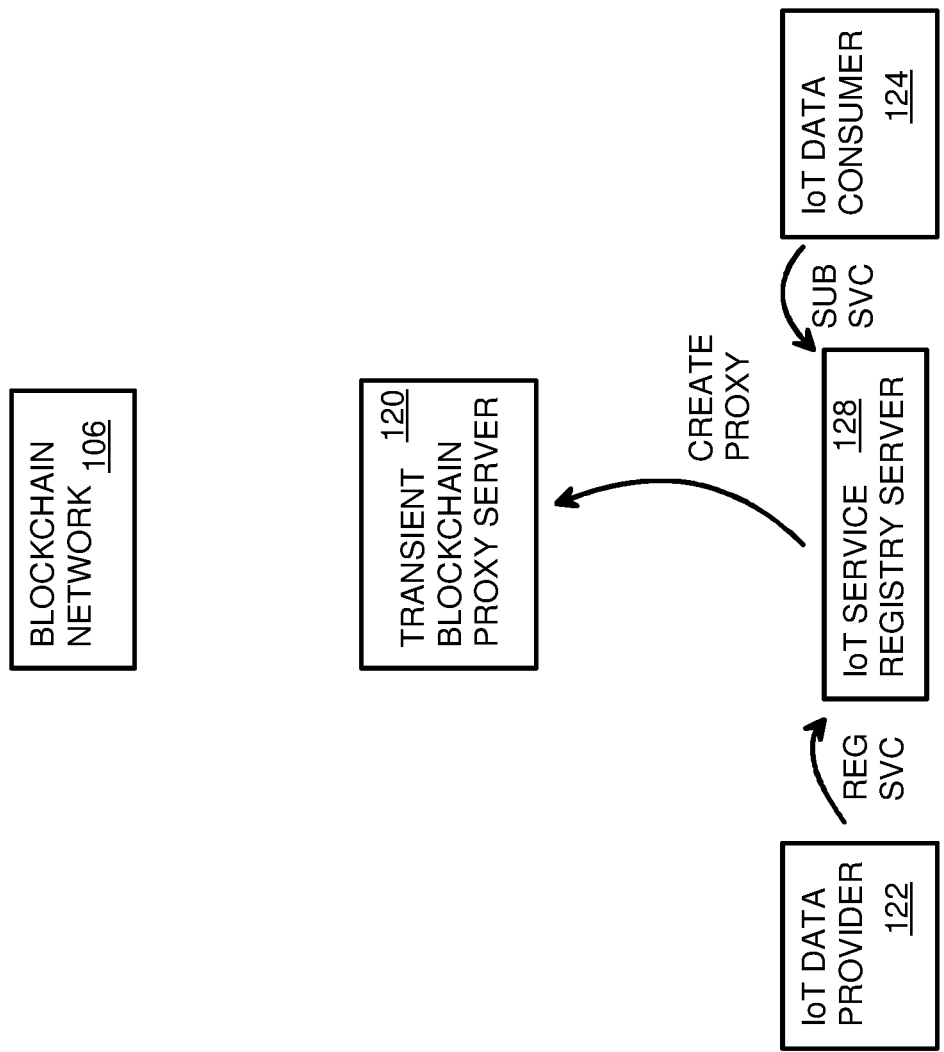
FIG. 13 shows the IoT data provider and IoT data customer registering for data verification services provided by the transient blockchain proxy server.

FIG. 13 shows the IoT data provider and IoT data customer registering for data verification services provided by the transient blockchain proxy server. IoT data provider 122 sends service details to IoT service registry server 128. These details can include various tiers of service, such as a premium tier with a faster guaranteed time of verification (TV) and standard tiers with slower guaranteed time of verification. Cost and other information can also be included. IoT service registry server 128 then creates a service entry for each of the services provided by IoT data provider 122 to register these services.

Customers can then browse the available services and tiers. IoT data customer 124 can select and subscribe to one of the registered services and providing information to IoT service registry server 128 such as the customer's phone, email, URL, or other address and billing information. A third-party financial or payment server may be consulted during the registration process.

Once IoT data customer 124 has subscribed to a service offered by IoT data provider 122, IoT service registry server 128 creates a new proxy or new instance of transient blockchain proxy server 120 or otherwise configures it to accept hashed data packets from IoT data provider 122. IoT data provider 122 can generate a new cryptographic key for this new customer and send the key to the customer and keep a copy so that both IoT data provider 122 and IoT data customer 124 can hash the data.

Figure 14:
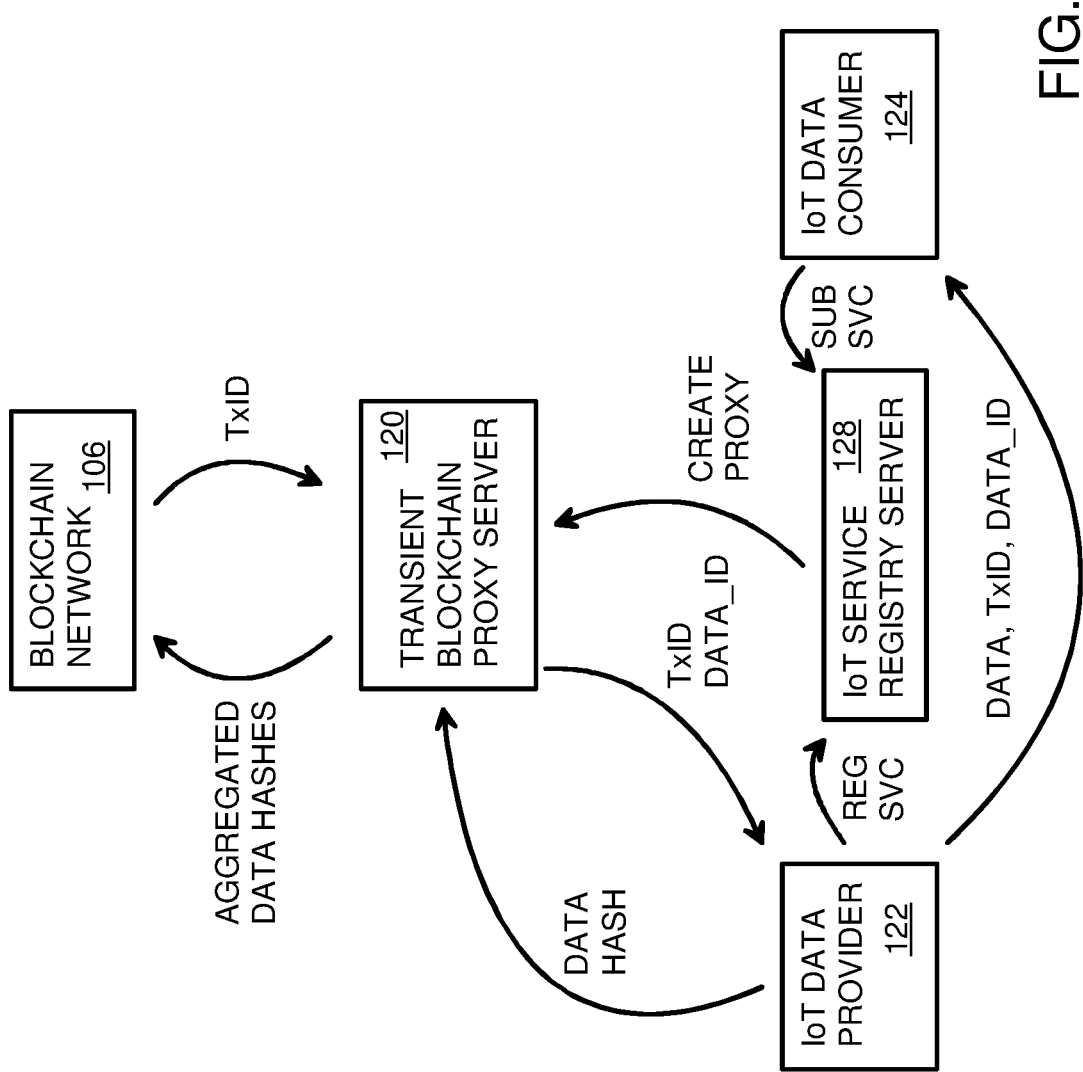
FIG. 14 shows the IoT service registry server configuring the transient blockchain proxy server to act as a proxy to blockchain network for registered IoT data providers and customers.

FIG. 14 shows the IoT service registry server configuring the transient blockchain proxy server to act as a proxy to blockchain network for registered IoT data providers and customers. Once IoT data provider 122 has registered a service and IoT data customer 124 has subscribed to the service, IoT service registry server 128 creates a proxy instance for IoT data provider 122 of transient blockchain proxy server 120. IoT data provider 122 can then send hashed data to transient blockchain proxy server 120, which aggregates hashed data and sends it to blockchain network 106. After the aggregated data is stored on the blockchain by blockchain network 106, the transaction ID, TxID, is sent to transient blockchain proxy server 120 and then transient blockchain proxy server 120 sends TxID back to IoT data provider 122.

IoT data provider 122 then sends the unhashed data and TxID to IoT data customer 124. IoT data customer 124 then can verify the data.

Figure 15:
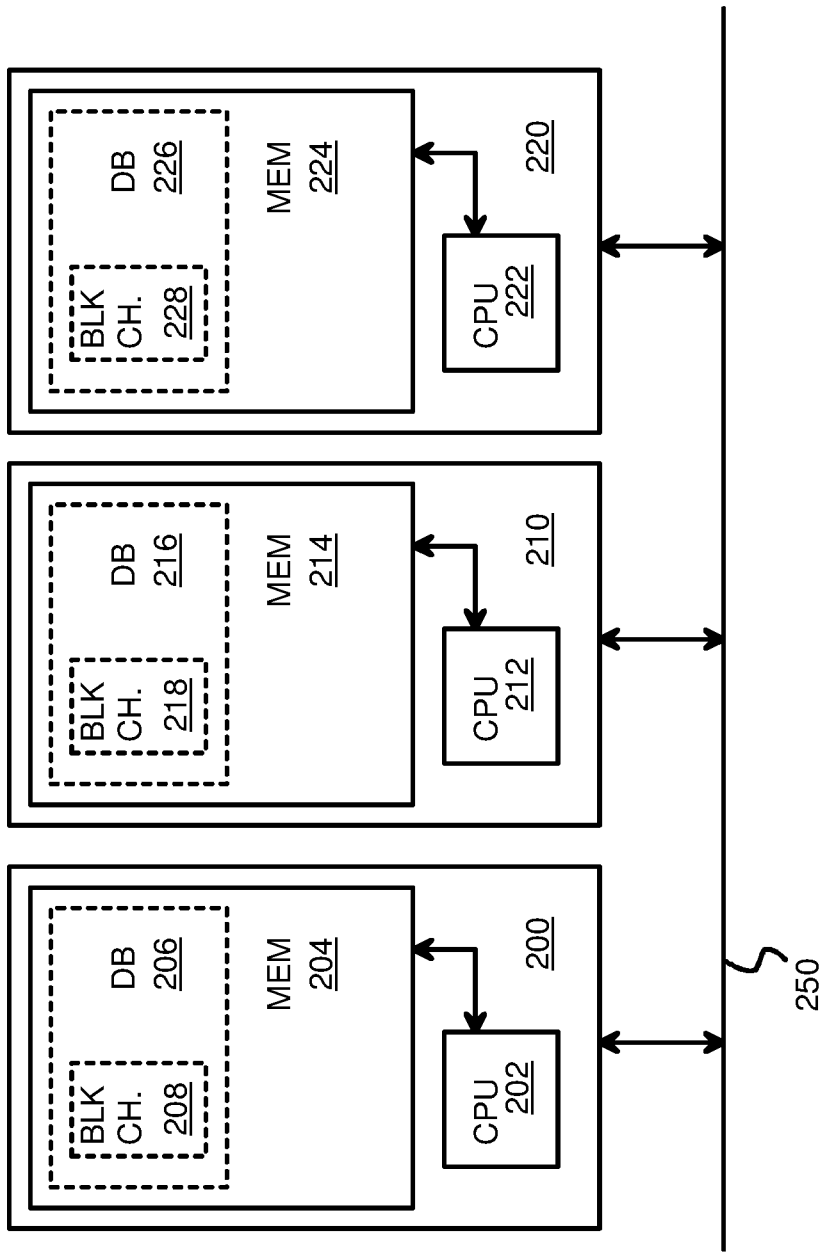
FIG. 15 is a diagram of server hardware in a network.

FIG. 15 is a diagram of server hardware in a network. Server 200 has Central Processing Unit (CPU) 202 that executes routines of instructions stored in memory 204, which can be constructed from a semiconductor memory, and can have a multi-level structure such as a fast Static Random-Access Memory (SRAM) cache memory, a slower Dynamic Random-Access Memory (DRAM) main memory, and a flash or hard disk mass storage system. Memory 204 can store various data structures such as database 206, and may keep a local copy of one or more blocks 208 on the blockchain. Various blockchain routines can be executed by CPU 202 or other processors to verify blocks 208 and refresh them with a data copy that is accepted by a majority of nodes on the blockchain network.

Network 250 can be the Internet and can include local network links or private connections between servers 200, 210, 220. CPU 212 on server 210 can write to its memory 214 to update its database 216 and ensure that its copy blockchain blocks, blocks 218, matches blocks 208, 228, and others on blockchain network 106. Likewise, CPU 222 on server 220 can write to its memory 224 to update its database 224 and its local copy of blockchain blocks, blocks 228.

Blockchain network 106 could be implemented by many copies of servers 200, 210, 220 in a distributed network of servers. Server 200 could implement any of IoT data providers 122, 122', 122", but blockchain blocks 208 are replaced by other local data structures. Server 210 could implement transient blockchain proxy server 120 where blockchain blocks 218 is replaced by a database of the hashed data and transaction IDs, and other server data. Server 220 could be used to implement IoT data customer 124, wherein blockchain blocks 228 are not present but the data, hashed data, and transaction ID's are stored in database 226. Many variations of the hardware are possible, such as by using several servers in different physical locations to implement transient blockchain proxy server 120, IoT data providers 122, 122', 122", IoT data customer 124, IoT service registry server 128, or other components.

Alternate Embodiments

Several other embodiments are contemplated by the inventors. For example many combinations and variations of the components, blocks, and procedures are possible. Overlap may be possible, or segregation. The CPU may have multiple processing cores, and there many be many CPUs in separate physical locations, and distributed memory, processing, and storage. Various redundancies may be added.

Blockchain network 106 many have many servers or node that run software to ensure consistency and score newly added blocks to prevent forks in the chain from propagating, and to prevent corruption of blocks. The data stored in the blocks is encrypted, so the blocks may be publicly available, and any alteration of the block would be detected by blockchain software when the altered block's hashes do not match with other blocks in the blockchain.

The transaction identifier is not necessarily a block ID of the new block, but the transaction identifier maps into the new block. The transaction identifier (TxID) may be an identifier used to uniquely identify a cryptocurrency transaction. TxID may be a combination of characters or numbers, and may be used to keep track of a transaction and verify its authenticity. Variations of the transaction identifier may include a hash of the transaction, a block ID, or a combination of both. Data_ID and TxID could be combined as a composite identifier or otherwise modified. TxID or Data_ID could be re-mapped, translated, or otherwise modified at various places, such as by transient blockchain proxy server 120 or IoT data provider 122.

While a public blockchain network 106 could be used that allows anyone to add blocks to the blockchain or perform other functions, a permissioned blockchain may be preferable for business applications, where permission is granted to certain users or companies to maintain and add to the blockchain while companies and persons without permission cannot add blocks without using a permissioned user. One or more users, companies, or organizations may be tasked with granting and revoking permissions for blockchain network 106. Unpermissioned users must use a permissioned user to add blocks to the blockchain, preventing network anarchy.

The process of FIG. 8 can be launched for each new buffer of hashed data and ended when the blockchain transaction is completed and TxID sent to all IoT data providers 122, 122', 122". There may be multiple instances of the process of FIG. 8 running simultaneously in transient blockchain proxy server 120 when blockchain transaction times are large. Then one instance can be receiving new hashed data, while one or more additional instances are waiting for blockchain network 106 to return the transaction ID. When transient blockchain proxy server 120 is slow, there may also be an instance where transient blockchain proxy server 120 is aggregating the hashed data and creating the transaction that has not yet been sent to blockchain network 106. Also, there may be parallel sets of instances of transient blockchain proxy server 120, such as one set for each data provider 122, 122', 122", or even one set for each service tier by IoT data provider 122. Instances of transient blockchain proxy server 120 may be created or ended, and the number of instances of transient blockchain proxy server 120 can change dynamically. Instances may be running or paused or dormant.

The blockchain verification node can be a third-party server or can be blockchain network 106, or IoT data customer 104 can read the current blockchain record from blockchain network 106 and perform its own verification by matching its stored hashed data to any portion of the hashed data read from the blockchain.

An alternative for FIG. 11D is for blockchain network 106 to verify the unhashed data received from IoT data provider 122. IoT data customer 124 uses the same cryptographic key to hash the data as was used by IoT data provider 122. This hashed data along with the transaction ID, TxID received from IoT data provider 122 is sent directly to blockchain network 106. Blockchain network 106 uses the TxID to read the aggregated hashed data from the block in the blockchain, and searches the aggregated data to see if the hashed data from IoT data customer 124 is found within the aggregated hashed data in the blockchain. If a match is found, blockchain network 106 sends a verification message back to IoT data customer 124. Transient blockchain proxy server 120 or another server could also perform verification as a service.

Transient blockchain proxy server 120 can keep a local copy of the aggregated hashed data stored in the blocks added to the blockchain by blockchain network 106. Then transient blockchain proxy server 120 can compare data hashes from 124 can compare data hashes from 124 to the local copy for validation.

Rather than validate one hashed data packet at a time, batch validation can be supported. In FIG. 12, IoT data customer 124 could send a list of hashed data and their TxID's to transient blockchain proxy server 120 or directly to blockchain network 106 for verification.

IoT data providers 122, 122', 122" can generate a new cryptographic key for each new customer and send this key to IoT data customer 124 so that both may hash data using the same key. blockchain network 106, transient blockchain proxy server 120, and others do not need the key. Thus, the data is secure since only hashed data is exposed to other servers, other than the original data being sent from IoT data providers 122, 122', 122" to IoT data customer 124. For added data security, IoT data providers 122, 122', 122" could also send the hashed data to IoT data customer 124 and allow IoT data customer 124 to use the key to recover the original data.

IoT data customer 124 could have many nodes that receive the data from IoT data providers 122, 122', 122", such as different internal databases, users, applications, and archival systems. IoT data providers 122, 122', 122" could be programmed to send the data and transaction ID to multiple destinations at IoT data customer 124 or just to one central destination at IoT data customer 124 that can be accessed by others at the customer site.

While sending guaranteed time of verification TV(x) with the hashed data to transient blockchain proxy server 120 has been described, transient blockchain proxy server 120 could calculate TV(x) using the time of arrival of the hashed data and other information such as the service tier or other time requirement settings or configurations for the customer or for batches of hashed data from IoT data providers 122, 122', 122". Having IoT data providers 122, 122', 122" calculate TV(x) and send TV(x) to transient blockchain proxy server 120 allows for more control of timing by IoT data providers 122, 122', 122". TV(x) for hashed data x could be formatted in a variety of ways, such as a time value, a time period, a number that selects a time period or class of service, etc.

A large amount of verifiable data can be sent from IoT data providers 122, 122', 122". Many data items such as GPS coordinates can be sent as verifiable data without overwhelming the blockchain network since transient blockchain proxy server 120 can consolidate many data transactions into one blockchain transaction.

Many variations of the data structures shown in FIGS. 6A-6D are possible, and additional tables, databases, directories, or other data structures may be added, such as for customer billing and other details. The data identifier Data_ID can be created by transient blockchain proxy server 120 and then sent back to IoT data provider 122, which can then send Data_ID back to the customer. Alternatively, IoT data provider 122 could create Data_ID and associate it with the Data and hashed data and send Data_ID to transient blockchain proxy server 120 along with the hashed data, and transient blockchain proxy server 120 could store this Data_ID, or possible use another internal data_id. IoT data provider 122 could wait to receive TxID and Data_ID before sending everything to IoT data customer 124, or IoT data provider 122 could immediately send the data to IoT data customer 124 so that IoT data customer 124 could immediately use the data before verification. IoT data provider 122 could first send the data to IoT data customer 124, and then late send the TxID, and use the same or a different Data_ID than used with transient blockchain proxy server 120.

While transient blockchain proxy server 120 has been described as acting a proxy of blockchain network 106 as seen by IoT data providers 122, 122', 122", the actual transaction identifier from blockchain network 106 is passed through to IoT data providers 122, 122', 122", so it is not a fully isolating proxy. Transient blockchain proxy server 120 does not have to store details of all prior transactions since the hashed data is permanently stored on the blockchain. Instances of transient blockchain proxy server 120 may be created or killed and removed when not currently needed. Thus transient blockchain proxy server 120 can be consider to be transient, even if transient blockchain proxy server 120 stores transaction details for a period of time after the transaction identifier is received and passed on to IoT data providers 122, 122', 122". If the blockchain network supports smart contract, transient blockchain proxy server 120 may be implemented in Blockchain Node.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computer-implemented method for supplying verifiable data comprising:

receiving requests from a plurality of providers, each request having hashed data that is a cryptographic hash of data provided by a provider in the plurality of providers to a customer;

buffering the requests received until a send time is reached;

consolidating all the requests received before the send time is reached by aggregating the hashed data from the requests received before the send time is reached to form aggregated hashed data;

sending the aggregated hashed data to a blockchain network with a blockchain request to add the aggregated hashed data to a new block on a blockchain;

the blockchain network creating a new block on the blockchain, the new block including the aggregated hashed data, a timestamp indicating a creation time of the new block, and a hash of an immediately prior block in the blockchain;

receiving a transaction identifier from the blockchain network in response to the blockchain request, wherein the transaction identifier identifies the new block added to the blockchain that contains the aggregated hashed data in the blockchain request; and sending the transaction identifier to the plurality of providers that sent requests that were consolidated to form the aggregated hashed data sent to the blockchain network.

2. The computer-implemented method of claim 1 wherein the plurality of providers each comprise a data provider that receives data for a customer and hashes the data to form the hashed data sent in the request and sends the data to the customer along with the transaction identifier.

3. The computer-implemented method of claim 2 wherein the customer verifies data received from the data provider by sending the transaction identifier to the blockchain network to receive a block copy, and hashing the data received to form local hashed data, and searching the block copy and signaling valid data when the local hashed data matches a portion of the aggregated hashed data in the block copy.

4. The computer-implemented method of claim 1 further comprising:
   receiving from a verification requestor a verification request with a transaction identifier;
   using the transaction identifier to retrieve a block copy from the blockchain network, the block copy having a copy of the aggregated hashed data;
   sending the copy of the aggregated hashed data back to the verification requestor in response to the verification request;
   wherein the verification requestor signals valid data when local hashed data to be verified matches a portion of the copy of the aggregated hashed data.

5. The computer-implemented method of claim 1 further comprising:
   receiving from a verification requestor a verification request with a transaction identifier and hashed data for verification;
   using the transaction identifier to retrieve a block copy from the blockchain network, the block copy having a copy of the aggregated hashed data;
   comparing the hashed data for verification to the copy of the aggregated hashed data and setting a status to valid when the hashed data for verification matches a portion of the copy of the aggregated hashed data;
   sending the status to the verification requestor in response to the verification request.

6. The computer-implemented method of claim 1 wherein the plurality of providers comprises a tracking-data provider that receives geo-coordinates of customer vehicles and sends the geo-coordinates to the customer along with the transaction identifier received when the aggregated hashed data includes a hash of the geo-coordinates,
   wherein the provider provides a vehicle tracking service for verifiable geo-coordinate data.

7. The computer-implemented method of claim 1 further comprising:
   signaling the send time using a timer after a fixed time period has elapsed.

8. The computer-implemented method of claim 1 further comprising:
   receiving a verification time along with the hashed data in each request from the plurality of providers;
   calculating an available time for each request being buffered before the send time, wherein the available time is a current time plus a required time needed by the blockchain network to return the transaction identifier in response to the aggregated hashed data minus the verification time for that request;
   signaling the send time when any request being buffered has an available time that is less than zero;
   whereby requests are buffered until the available time reaches zero for any pending request being buffered.

9. The computer-implemented method of claim 8 wherein the required time also includes a buffer time to account for additional delays.

10. The computer-implemented method of claim 8 wherein the verification time is increased for requests having hashed data for customers having a low service tier and the verification time is reduced for customers having a fast service tier;
    wherein multi-tiered services are enabled by varying the verification time that is used to signal the send time.

11. The computer-implemented method of claim 8 wherein aggregating the hashed data from the requests received before the send time is reached to form the aggregated hashed data further comprises
    concatenating the hashed data from the requests to form the aggregated hashed data.

12. A verifiable-data exchange system comprising:
    a data provider that receives data streams for transmission to data customers, the data provider generating hashed data from data from the data streams using a cryptographic key, the data provider generating a provider request having the hashed data;
    a blockchain network that creates a new block on a blockchain and stores hashed data in the new block in response to an add-block request;
    wherein the new block has a timestamp indicating a creation time of the new block, a hash of a preceding block in the blockchain, and a new data hash;
    wherein the blockchain network generates a transaction identifier for the new block and sends back the transaction identifier in response to the add-block request;
    a blockchain proxy server coupled between the data provider and the blockchain network, the blockchain proxy server receiving the provider request from the data provider, the blockchain proxy server also receiving a plurality of provider requests from a plurality of the data provider;
    a buffer in the blockchain proxy server for buffering the plurality of provider requests until a send time is reached;
    an aggregator in the blockchain proxy server that combines the hashed data from pending requests to form an aggregated data hash that is sent to the blockchain network in the add-block request when the send time is reached;
    a data customer that receives from the data provider the data from the data streams and the transaction identifier that the data provider receives from the blockchain proxy server; and
    a data verifier that receives the transaction identifier and hashed data for verification, the data verifier sending the transaction identifier to the blockchain network to retrieve the new block, the data verifier comparing the hashed data in the new block with the hashed data for verification and signaling valid data when the hashed data for verification is found within the hashed data in the new block;
    whereby data is consolidated before adding to the blockchain and verified using a shared transaction identifier.

13. The verifiable-data exchange system of claim 12 wherein each provider request further comprises a verification time that indicates when the data exceeds a guaranteed time of verification.

14. The verifiable-data exchange system of claim 13 wherein the guaranteed time of verification is extended for slower tiers of service and is reduced for faster tiers of service provided to the data customer by the data provider.

15. The verifiable-data exchange system of claim 12 further comprising:
- an available-time calculator that calculates an available time for each provider request in the buffer, wherein the available time is a current time plus a required time needed by the blockchain network to return the transaction identifier in response to the add-block request;
- a sender that signals the send time when any provider request in the buffer has an available time that is less than zero;
- whereby the plurality of provider requests are buffered until the available time reaches zero for any pending provider request in the buffer.

16. A non-transitory computer-readable medium for storing computer-executable instructions, the computer-executable instructions when executed by a processor implementing a method comprising:
- receiving requests from a plurality of providers, each request having hashed data that is a cryptographic hash of data provided by a provider in the plurality of providers to a customer;
- buffering the requests received until a send time is reached;
- consolidating all the requests received before the send time is reached by aggregating the hashed data from the requests received before the send time is reached to form aggregated hashed data;
- sending the aggregated hashed data to a blockchain network with a blockchain request to add the aggregated hashed data to a new block on a blockchain;
- the blockchain network creating a new block on the blockchain, the new block including the aggregated hashed data, a timestamp indicating a creation time of the new block, and a hash of an immediately prior block in the blockchain;
- receiving a transaction identifier from the blockchain network in response to the blockchain request, wherein the transaction identifier identifies the new block added to the blockchain that contains the aggregated hashed data in the blockchain request; and
- sending the transaction identifier to the plurality of providers that sent requests that were consolidated to form the aggregated hashed data sent to the blockchain network.

17. The non-transitory computer-readable medium of claim 16, wherein the method further comprises:
- receiving a verification time along with the hashed data in each request from the plurality of providers;
- calculating an available time for each request being buffered before the send time, wherein the available time is a current time plus a required time needed by the blockchain network to return the transaction identifier in response to the aggregated hashed data minus the verification time for that request;
- signaling the send time when any request being buffered has an available time that is less than zero;
- whereby requests are buffered until the available time reaches zero for any pending request being buffered.

18. The non-transitory computer-readable medium of claim 17, wherein the method further comprises:
- increasing verification time for requests having hashed data for customers having a low service tier and reducing the verification time for customers having a fast service tier;
- wherein multi-tiered services are enabled by varying the verification time that is used to signal the send time.

19. The non-transitory computer-readable medium of claim 18, wherein the method further comprises:
- verifying data received from the provider by sending the transaction identifier to the blockchain network to receive a block copy, and hashing the data received to form local hashed data, and searching the block copy and signaling valid data when the local hashed data matches a portion of the aggregated hashed data in the block copy.

20. The non-transitory computer-readable medium of claim 18, wherein the method further comprises:
- receiving from a verification requestor a verification request with a transaction identifier;
- using the transaction identifier to retrieve a block copy from the blockchain network, the block copy having a copy of the aggregated hashed data;
- sending the copy of the aggregated hashed data back to the verification requestor in response to the verification request;
- wherein the verification requestor signals valid data when local hashed data to be verified matches a portion of the copy of the aggregated hashed data.

\* \* \* \* \*